(12) United States Patent
Guo et al.

(10) Patent No.: US 9,912,944 B2
(45) Date of Patent: Mar. 6, 2018

(54) SIMPLIFIED NON-SQUARE QUADTREE TRANSFORMS FOR VIDEO CODING

(71) Applicant: QUALCOMM Incorporated, San Diego, CA (US)

(72) Inventors: Liwei Guo, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 13/863,266

(22) Filed: Apr. 15, 2013

(65) Prior Publication Data

US 2013/0272381 A1 Oct. 17, 2013

Related U.S. Application Data

(60) Provisional application No. 61/625,038, filed on Apr. 16, 2012, provisional application No. 61/637,220, filed on Apr. 23, 2012.

(51) Int. Cl.
*H04N 7/50* (2006.01)
*H04N 19/61* (2014.01)
(Continued)

(52) U.S. Cl.
CPC ..... *H04N 19/00781* (2013.01); *H04N 19/119* (2014.11); *H04N 19/122* (2014.11); (Continued)

(58) Field of Classification Search
None
See application file for complete search history.

(56) References Cited

U.S. PATENT DOCUMENTS 9,565,438 B2 2/2017 Min et al.
2011/0038412 A1* 2/2011 Jung et al. ............... 375/240.12
(Continued)

FOREIGN PATENT DOCUMENTS

EP 2547107 A2 1/2013
WO WO 2011068360 A2 * 6/2011
(Continued)

OTHER PUBLICATIONS

Yuan et al. (Non-Square Quadtree Transform for Symmetric and Asymmetric Motion Partition, Jul. 14-22, 2011).*
(Continued)

*Primary Examiner* — Andy Rao
*Assistant Examiner* — Samuel D Fereja
(74) *Attorney, Agent, or Firm* — Shumaker & Sieffert, P.A.

(57) ABSTRACT

In an example, a method of decoding video data includes determining a prediction partitioning structure for predicting pixel values associated with a block of video data. The method also includes determining a transform partitioning structure for applying one or more transforms to the predicted pixel values. Determining the transform split structure includes splitting a parent transform unit, upon determining the transform partitioning structure comprises splitting the parent transform unit into one or more square transforms, determining one or more square transforms such that each of the one or more square transforms correspond to exactly one prediction partition, and upon determining the transform partitioning structure comprises splitting the parent transform unit into one or more non-square transforms, determining whether to split the one or more non-square transforms based at least in part on the one or more non-square transforms being non-square.

50 Claims, 17 Drawing Sheets

(51) Int. Cl.
*H04N 19/159* (2014.01)
*H04N 19/119* (2014.01)
*H04N 19/122* (2014.01)
*H04N 19/96* (2014.01)

(52) U.S. Cl.
CPC ......... *H04N 19/159* (2014.11); *H04N 19/619* (2014.11); *H04N 19/96* (2014.11)

(56) References Cited

U.S. PATENT DOCUMENTS

| | | |
|---|---|---|
| 2011/0038415 A1* | 2/2011 | Min et al. ............... 375/240.12 |
| 2011/0135000 A1* | 6/2011 | Alshina et al. .......... 375/240.13 |
| 2011/0243225 A1* | 10/2011 | Min et al. ............... 375/240.12 |
| 2012/0183052 A1* | 7/2012 | Lou et al. ............... 375/240.03 |
| 2012/0183080 A1* | 7/2012 | Zhou ....................... 375/240.26 |
| 2012/0236939 A1 | 9/2012 | Filippini et al. |
| 2012/0281928 A1* | 11/2012 | Cohen et al. ............... 382/240 |
| 2013/0003824 A1 | 1/2013 | Guo et al. |
| 2013/0022107 A1 | 1/2013 | Van Der Auwera et al. |
| 2013/0177079 A1* | 7/2013 | Kim ....................... H04N 19/96 375/240.12 |
| 2013/0294525 A1* | 11/2013 | Norkin et al. ........... 375/240.24 |

FOREIGN PATENT DOCUMENTS

| | | |
|---|---|---|
| WO | 2011127963 A1 | 10/2011 |
| WO | 2011129620 A2 | 10/2011 |

OTHER PUBLICATIONS

Bross et al., "High efficiency video coding (HEVC) text specification draft 10 (for FDIS & Last Call)," 12th Meeting: Geneva CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Cao et al., "CE6.b Report on test1 Harmonization of SDIP and RQT", JCT-VC Meeting; MPEG Meeting; Torino; Joint Collaborative Team on Video Coding of ISO/IEC JTC1/SC29/WG11 and ITU-T SG.16; Document No. JCTVC-F533, Jul. 14-22, 2011, 4 pp.
Guo et al., "Limiting Chroma Transform Depth in Residue Quad Tree (RQT)," JCT-VC Meeting, MPEG Meeting, Geneva, (Joint Collaborative Team on Video Coding of ISO/IEC JTC1/SC29/WG11 AND ITU-T SG.16), URL: http://wftp3.itu.int/av-arch/jctvc-site/, Document No. JCTVC-E377, Mar. 16-23, 2011, 3 pp.
International Preliminary Report on Patentability—PCT/US2013/036791—The International Bureau of WIPO Geneva Switzerland dated Apr. 9, 2014, 7 pp.
International Search Report and Written Opinion—PCT/US2013/036791—ISA/EPO—dated Jul. 1, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.
Panusopone et al., "Proposal on RQT root location," MPEG Meeting; Geneva; (Motion Picture Expert Group or ISO/IEC JTC1/SC29/WG11) Document No. JCTVC-E364-r2, WG11 No. m19893, Mar. 16-23, 2011, 10 pp.
Panusopone et al., "RQT with rectangular transform unit support," JCT-VC Meeting; MPEG Meeting; Torino; (Joint Collaborative Team on Video Coding of ISO/IEC JTC1/SC29/WG11 and ITU-T SG.16 ); URL: http://wftp3.itu.int/av-arch/jctvc-site/ Document No. JCTVC-F578, Jul. 14-22, 2011, 3 pp.
Sullivan et al., "Overview of the High Efficiency Video Coding (HEVC) Standard," IEEE Transactions on Circuits and Systems for Video Technology, vol. 22, No. 12, Dec. 2012, 20 pp.
Tan et al., "On residual quad-tree coding in HEVC," Multimedia Signal Processing (MMSP 2011),13th International Workshop on, IEEE, Oct. 17, 2011, 4 pp.
Wiegand et al., "BoG report: residual quadtree structure," MPEG Meeting; Guangzhou; (Motion Picture Expert Group or ISO/IEC JTC1/SC29/WG11), Document No. JCTVC-C319, WG11 No. m18590, Oct. 7-15, 2010, 17 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Yuan et al., "Quadtree Based Nonsquare Block Structure for Inter Frame Coding in High Efficiency Video Coding," IEEE Transactions on Circuits and Systems for Video Technology, vol. 22, No. 12, Dec. 2012, 13 pp.
Zhou et al., "Evaluation Results on Residual Quad Tree (RQT)," MPEG Meeting, DAEGU, (Motion Picture Expert Group or ISO/IEC JTC1/SC29/WG11), Document No. JCTVC-D060, WG11 No. m18807, Jan. 20-28, 2011, 7 pp.
Reply to Written Opinion dated Jul. 1, 2013, from international application No. PCT/US2013/036791, dated Feb. 13, 2014, 29 pp.
Guo et al.,"Non-Square Transform for 2NxN and Nx2N Motion Partitions," JCT-VC Meeting; MPEG Meeting; Jul. 14-22, 2011; Torino, IT (Joint Collaborative Team on Video Coding of ISO/IEC JTC1/SC29/WG11 and ITU-T SG. 16) ; URL: http://wftp3.itu.int/av-arch/jctvc-site/, No. JCTVC-F563, Jul. 16, 2011, 9 pp.
McCann et al., "High Efficiency Video Coding (HEVC) Test Model 5 (HM 5) Encoder Description," JCT-VC Meeting; MPEG Meeting; Nov. 21-30, 2011; Geneva, CH (Joint Collaborative Team on Video Coding (JCT-VC) of ISO/IEC JTC1/SC29/WG11 and ITU-T SG.16); URL:http://wftp3.itu.int/av-arch/jctvc-site/, No. JCTVC-G1102, Jan. 30, 2012, 45 pp.
Panusopone et al., "Efficient Transform Unit Representation," Joint Collaborative Team on Video Coding (JCT-VC) of ITU-T SG16 WP3 and ISO/IEC JTC1/SC29/WG11; Jan. 20-28, 2011; JCTVC-D250_r2, ITU-T, Jan. 28, 2011, 3 pp.
Yuan et al., "CE2: Non-Square Quadtree Transform for symmetric and asymmetric motion partition," Jul. 14-22, 2011; Joint Collaborative Team on Video Coding of ITU-T SG16 WP3 and ISO/IEC JTC/SC29/WG11, JCTVC-F412, 6th Meeting, Torino, IT, Jul. 2, 2011, 7 pp.

\* cited by examiner

NX2N PU (64X64)

DEPTH=0 TRANSFORM
NOT APPLICABLE

DEPTH=1 TRANSFORM
(32X32)

DEPTH=2 TRANSFORM
(32X8)

NX2N PU (32X32)

DEPTH=0 TRANSFORM
(32X32)

DEPTH=1 TRANSFORM
(32X8)

DEPTH=2 TRANSFORM
(16X4)

NX2N PU (16X16)

DEPTH=0 TRANSFORM
(16X16)

DEPTH=1 TRANSFORM
(16X4)

DEPTH=2 TRANSFORM
(4X4)

SIMPLIFIED NON-SQUARE QUADTREE TRANSFORMS FOR VIDEO CODING

This disclosure claims benefit of U.S. Provisional Application 61/625,038, filed 16 Apr. 2012 and U.S. Provisional Application No. 61/637,220, filed 23 Apr. 2012, the entire contents of each of which are incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for video coding with non-square blocks. Video coding generally includes prediction (e.g., inter-prediction or intra-prediction) and coding of residual data (also referred to as prediction error). A residual block corresponds to pixel-by-pixel differences between a predicted block and an actual block of video data. The residual block may correspond to a transform unit (TU). Data describing the manner in which the predicted block is generated may correspond to a PU.

In some cases, video data may be predicted using non-square blocks, e.g., with non-square (also referred to as asymmetric) PUs. This disclosure describes techniques for applying transforms so that the transforms are not applied to more than one PU. For example, this disclosure describes techniques for avoiding the application of transforms across prediction partition boundaries, which may provide increased coding efficiency.

In some cases, video data may be transformed using non-square blocks, e.g., with non-square TUs. Sizes of TUs may be described by a quadtree data structure. This disclosure describes techniques for simplifying non-square quadtree transforms (NSQTs). In this manner, these techniques may provide a simplified scheme for using non-square transforms.

In one example, a method includes determining a prediction partitioning structure for predicting pixel values associated with a block of video data, wherein the prediction partitioning structure includes one or more non-square partitions, and determining a transform partitioning structure for applying one or more transforms to the predicted pixel values. Determining the transform split structure includes splitting a parent transform unit, upon determining the transform partitioning structure comprises splitting the parent transform unit into one or more square transforms, determining one or more square transforms such that each of the one or more square transforms correspond to exactly one prediction partition, and upon determining the transform partitioning structure comprises splitting the parent transform unit into one or more non-square transforms, determining whether to split the one or more non-square transforms based at least in part on the one or more non-square transforms being non-square. The method also includes decoding the predicted pixel values based on the determined transform partitioning structure.

In another example, a method of encoding video data includes determining a prediction partitioning structure for predicting pixel values associated with a block of video data, wherein the prediction partitioning structure includes one or more non-square partitions, and determining a transform partitioning structure for applying one or more transforms to the predicted pixel values. Determining the transform split structure includes splitting a parent transform unit, upon determining the transform partitioning structure comprises splitting the parent transform unit into one or more square transforms, determining one or more square transforms such that each of the one or more square transforms correspond to exactly one prediction partition, and upon determining the transform partitioning structure comprises splitting the parent transform unit into one or more non-square transforms, determining whether to split the one or more non-square transforms based at least in part on the one or more non-square transforms being non-square. The method also includes encoding the predicted pixel values based on the determined transform partitioning structure.

In another example, an apparatus for coding video data comprising one or more processors configured to determine a prediction partitioning structure for predicting pixel values associated with a block of video data, wherein the prediction partitioning structure includes one or more non-square partitions, and determine a transform partitioning structure for applying one or more transforms to the predicted pixel values. Determining the transform split structure includes splitting a parent transform unit, upon determining the transform partitioning structure comprises splitting the parent transform unit into one or more square transforms, determine one or more square transforms such that each of the one or more square transforms correspond to exactly one prediction partition, and upon determining the transform partitioning structure comprises splitting the parent transform unit into one or more non-square transforms, determine whether to split the one or more non-square transforms based at least in part on the one or more non-square transforms being non-square. The one or more processors are also configured to code the predicted pixel values based on the determined transform partitioning structure.

In another example, an apparatus for coding video data includes means for determining a prediction partitioning structure for predicting pixel values associated with a block of video data, wherein the prediction partitioning structure includes one or more non-square partitions, and means for determining a transform partitioning structure for applying one or more transforms to the predicted pixel values. Determining the transform split structure includes splitting a parent transform unit, upon determining the transform partitioning structure comprises splitting the parent transform unit into one or more square transforms, determine one or more square transforms such that each of the one or more square transforms correspond to exactly one prediction partition, and upon determining the transform partitioning structure comprises splitting the parent transform unit into one or more non-square transforms, determine whether to split the one or more non-square transforms based at least in part on the one or more non-square transforms being non-square. The apparatus also includes means for coding the predicted pixel values based on the determined transform partitioning structure.

In another example, a non-transitory computer-readable medium storing instructions thereon that, when executed, cause one or more processors to determine a prediction partitioning structure for predicting pixel values associated with a block of video data, wherein the prediction partitioning structure includes one or more non-square partitions, and determine a transform partitioning structure for applying one or more transforms to the predicted pixel values. Determining the transform split structure includes splitting a parent transform unit, upon determining the transform partitioning structure comprises splitting the parent transform unit into one or more square transforms, determine one or more square transforms such that each of the one or more square transforms correspond to exactly one prediction partition, and upon determining the transform partitioning structure comprises splitting the parent transform unit into one or more non-square transforms, determine whether to split the one or more non-square transforms based at least in part on the one or more non-square transforms being non-square. The instructions also cause the one or more processors to code the predicted pixel values based on the determined transform partitioning structure.

The details of one or more examples are set forth in the accompanying drawings and the description below. Other features, objects, and advantages will be apparent from the description and drawings, and from the claims.

DETAILED DESCRIPTION

Figure 1:
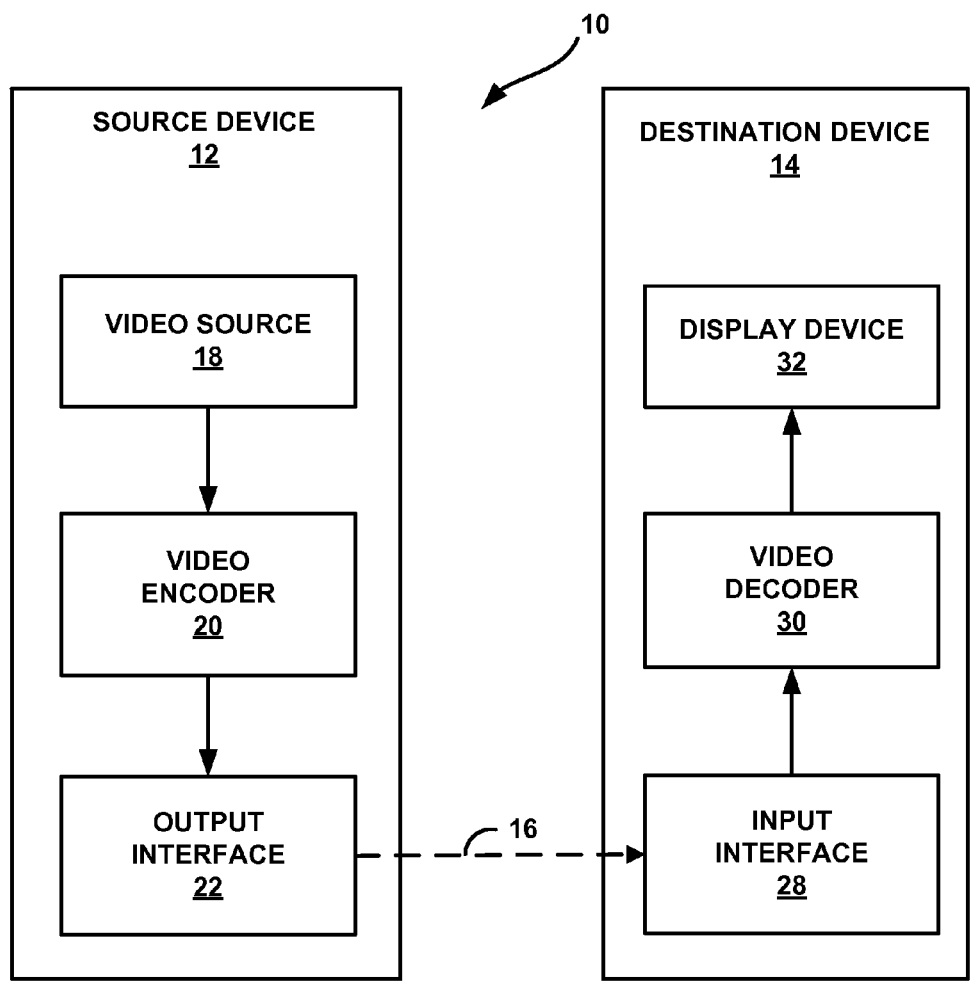
FIG. 1 is a block diagram illustrating an example video encoding and decoding system that may utilize techniques for applying transforms in video coding.

Video coding devices implement video compression techniques to encode and decode video data efficiently. Video compression techniques may include applying spatial (intra-frame) prediction and/or temporal (inter-frame) prediction techniques to reduce or remove redundancy inherent in video sequences. A video encoder typically partitions each picture of an original video sequence into rectangular regions referred to as video blocks or coding units (CUs), as described in greater detail below. These video blocks may be encoded using an intra mode (I-mode) or using an inter mode (P-mode or B-mode).

For P-mode and B-mode, a video encoder first searches for a block similar to the one being encoded in a frame in another temporal location, referred to as a reference frame and denoted as $F_{ref}$. The video encoder may restrict the search to a certain spatial displacement from the block to be encoded. A best match may be located using a two-dimensional (2D) motion vector ($\Delta x$, $\Delta y$) where $\Delta x$ is the horizontal and $\Delta y$ is the vertical displacement, relative to the block being coded. The motion vectors together with the reference frame may be used to construct a prediction unit (PU), also referred to as a prediction partition or a predicted block $F_{pred}$:

$$F_{pred}(x,y)=F_{ref}(x+\Delta x,y+\Delta y)$$

where the location of a pixel within the picture is denoted by (x, y).

For blocks encoded in I-mode, the video encoder may form the predicted block using spatial prediction techniques based on data from previously encoded neighboring blocks within the same picture.

In any case, for both I-mode and P- or B-mode, the prediction error, i.e., the difference between the pixel values in the block being encoded and the predicted block, may be represented as a set of weighted basis functions of a discrete transform, such as a discrete cosine transform (DCT). Transforms may be performed using different sizes of blocks (transform units (TUs)), such as 4×4, 8×8 or 16×16 and larger. The shape of a transform block need not always be square. For example, rectangular shaped transform blocks may also be used, e.g. with a transform block size of 16×4, 32×8, etc.

After transformation, the weights (i.e., the transform coefficients) are subsequently quantized. Quantization introduces a loss of information, and as such, quantized coefficients have lower precision than the original transform coefficients. The compression ratio, i.e. the ratio of the number of bits used to represent original sequence and the compressed one, may be controlled by adjusting the value of the quantization parameter (QP) used when quantizing transform coefficients.

The quantized transform coefficients and motion vectors are examples of syntax elements, which along with control information and possibly other coded video information, form a coded representation of a video sequence. In some instances, the video encoder may entropy code syntax elements, thereby further reducing the number of bits needed for their representation. Entropy coding is a lossless operation aimed at minimizing the number of bits required to represent transmitted or stored symbols (e.g., syntax elements) by utilizing properties of the distribution of the syntax elements (e.g., recognizing that some symbols occur more frequently than others).

A video encoder may also reproduce coded pictures to calculate distortion, which corresponds to the reconstruction error. A video encoder may measure bitrates and amounts of distortion when determining various coding factors, such as block sizes, block partitioning strategies, quantization parameters, coding modes, and the like. Block partitioning strategies may include partitioning of CUs into sub-CUs, selections of PU sizes, and selection of TU sizes. The compression ratio, i.e., the ratio of the number of bits used to represent original sequence and the compressed one, may be controlled by adjusting the value of the quantization parameter (QP) used when quantizing transform coefficients. The compression ratio may also depend on the method of entropy coding employed.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

As noted above, video coders, such as video encoders and video decoders, may be configured to use blocks of various sizes, and the blocks may be non-square. For example, a video coder may use PUs and TUs that are non-square, such as rectangular. In some instances, non-square blocks may introduce complexity to the video coding process. In an example, coding a block of video data using one or more non-square PUs and one or more square TUs may result in a transform being applied to more than one prediction partition. Such a transform configuration may impact coding efficiency. For example, a region of an image that includes multiple prediction partitions (e.g., PUs) may indicate that there is a discontinuity in the region. Applying a single transform across the discontinuity, e.g., across the prediction partitions, may produce high frequency noise that impacts coding efficiency.

Aspects of this disclosure generally relate to applying transforms to residual video data without crossing a prediction partition boundary. That is, according to aspects of this disclosure, a video coder, such as a video encoder or a video decoder, may apply one or more square transforms to non-square prediction partitions such that the one or more transforms are not applied to more than one prediction partition. Accordingly, transforms do not cross prediction partition boundaries, and the video coder may avoid introducing potential high frequency noise, as described above.

This disclosure may generally refer to a prediction partition as an area of a picture that is predicted with a single prediction technique (e.g., an inter-prediction or intra-prediction technique). A block of video data may have one or more associated prediction partitions. In some instances, a prediction partition may be associated with a prediction unit (PU), as described according to the High Efficiency Video Coding (HEVC) standard. As noted above, a prediction partition may be square or non-square in shape.

In another example, using non-square blocks (including non-square transform blocks) may also introduce complexity associated with indicating the arrangement of blocks. For example, in some instances, signaling an arrangement of non-square TUs in a bitstream may be relatively complex. In addition, some video coding standards, such as the HEVC standard, may have relatively complicated rules for applying non-square transforms.

In an example, a non-square transform may be split into four non-square transforms (e.g., a 32×8 transform may be split into four 16×4 transforms). In another example, a non-square transform may be split into four square transform (e.g. a 16×4 transform may be split into four 4×4 transforms). In addition, in some instances, a video coder may apply a non-square transform at depth 1 of a residual quad tree (RQT) (as described in greater detail below), while in another example, the video coder may apply a non-square transform at depth 2 of the RQT. Accordingly, a video coder may split a block for purposes of transformation using a combination of square and non-square transforms, the arrangement of which may be relatively complex to indicate in an encoded bitstream.

Aspects of this disclosure also generally relate to techniques for simplifying application of non-square transforms. For example, according to aspects of this disclosure, a video coder, such as a video encoder or a video decoder may adhere to one or more predefined rules associated with the structure of non-square transforms. In one example, a video coder may refrain from splitting a non-square transform. In other words, when the video coder determines that a TU has been split into at least one non-square TU, the video coder may determine that the non-square TU is not further split.

According to the example above, when a square transform is split into four non-square transforms the splitting stops. Thus, a video encoder would not attempt to further split the transforms and would not signal any additional data indicating whether the four non-square transforms are split. Likewise, a video decoder would not need any further data (as signaled, for example, in an encoded bitstream) to determine that the four non-square transforms are not split further.

Accordingly, in such examples, the presence of non-square transforms could be interpreted to not only define a non-square shape of the transforms, but also to signify the end of splitting with respect to the non-square TU. In these cases, additional signaling otherwise used for the splitting may be avoided for such non-square transforms. For example, a "no-split" or "do not split" flag may be eliminated for non-square transforms.

In another example, a non-square transform may only be split into additional non-square transforms. That is, after splitting a TU into non-square transforms, a video coder may continue to split the non-square transforms into non-square transforms, but may not split the non-square transforms into square transforms. The video coder may continue to split non-square transforms using non-square transforms until reaching a minimum transform size restriction.

In this way, the techniques of this disclosure may help to reduce the complexity associated with applying non-square transforms. For example, a video coder may implement a set of rules based on whether a TU is split into non-square transforms to reduce the number of potential combinations of square and non-square transforms. Doing so may reduce the complexity associated with signaling the arrangement and/or structure of a block having one or more associated non-square transforms.

The amount of data needed for signaling may also be reduced by eliminating the need to signal the end of splitting, in some cases. For example, a "no-split" or "do not split" flag may be eliminated for non-square transforms. In examples where splitting is allowed for non-square transforms, but restricted to further non-square sizes or shapes, the techniques may reduce the size of syntax elements needed for signaling the splitting. For example, if restrictions are applied to the type of splitting that can be used, the bit-depths needed to signal the type of slitting may be reduced for some cases.

FIG. 1 is a block diagram illustrating an example video encoding and decoding system 10 that may utilize techniques for applying transforms in video coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for applying transforms in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for applying transforms in video coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following transformation, video encoder 20 may quantize the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30 may, upon receiving the coded video data, may perform a decoding pass that is generally similar to the encoding pass described with respect to video encoder 20. For example, during the decoding process, video decoder 30 may receive an encoded video bitstream that represents video blocks of an encoded video slice and associated syntax elements. Video decoder 30 may decode the bitstream to generate quantized coefficients, motion vectors, and other syntax elements. Video decoder 30 may receive the syntax elements at the video slice level and/or the video block level.

As noted above, video encoder 20 and/or video decoder 30 may be configured to use blocks of various sizes, and the blocks may be non-square. For example, video encoder 20 and/or video decoder 30 may use PUs and TUs that are non-square, such as rectangular.

In some instances, non-square blocks may introduce complexity to the video coding process. For example, coding a block of video data using one or more non-square PUs and one or more square TUs may result in a transform being applied to more than one prediction partition, which may impact coding efficiency. In another example, signaling an arrangement of non-square TUs in a bitstream may be relatively complex. In addition, some video coding standards, such as the HEVC standard, may have relatively complicated rules for applying non-square transforms.

Aspects of this disclosure generally relate to simplifying application of non-square transforms. For example, according to aspects of this disclosure, video encoder 20 and/or video decoder 30 may determine a prediction partitioning structure for predicting pixel values associated with a block of video data that includes one or more non-square partitions. Video encoder 20 and/or video decoder 30 may also determine a transform partitioning structure for applying one or more transforms to the predicted pixel values. In some examples, video encoder 20 and/or video decoder 30 may split a parent TU into one or more sub-TUs. When the transform partitioning structure includes splitting the parent TU into one or more square transforms, video encoder 20 and/or video decoder 30 may determine the one or more square transforms such that each of the one or more square transforms correspond to exactly one prediction partition. When the transform partitioning structure includes splitting the parent TU into one or more non-square transforms, video encoder 20 and/or video decoder 30 may determine whether to split the one or more non-square transforms based at least in part on the one or more non-square transforms being non-square. Video encoder 20 and/or video decoder 30 may then code the predicted pixel values based on the determined transform partitioning structure.

For example, with respect to determining one or more square transforms such that each of the one or more square transforms correspond to exactly one prediction partition, according to aspects of this disclosure, video encoder 20 and/or video decoder 30 may apply transforms to residual video data without crossing a prediction partition boundary. That is, according to aspects of this disclosure, video encoder 20 and/or video decoder 30 may apply square transforms to a PU having one or more non-square partitions, such that the transforms are not applied to more than one prediction partition.

In some instances, the techniques may be implemented in conjunction with a forced transform splitting process. For example, as described in greater detail below, a maximum RQT depth can be selected by video encoder 20 and signaled video decoder 30 using high level syntax. The maximum RQT depth limits the number of times transform splitting may occur. For example, if maximum RQT depth is set to be 1, there is only one transform choice, i.e. Depth 0 transform.

However, in some instances, video encoder 20 and/or video decoder 30 may perform forced transform splitting (e.g., overriding the set maximum RQT depth) based on prediction partition boundaries. For example, as described in greater detail below, a depth 0 transform has the size of the CU and thus will span a prediction partition boundary for any non-2N×2N PUs (e.g., any PUs having multiple prediction partitions). Accordingly, for non-2N×2N PUs, video encoder 20 and/or video decoder 30 may perform a forced split to prevent a single transform from spanning more than on PU.

In instances in which non-square transforms are not available, however, performing a forced transform split may still result in a TU spanning more than one prediction partition of a PU. For example, as described in greater detail below, forced transform splits for certain prediction modes, such as Asymmetric Motion Partition (AMP) modes, may cause a transform to span a motion boundary (a boundary separating independently predicted motion partitions). That is, one transform is applied to two different prediction partitions.

In some examples, the techniques of this disclosure may be applied in a forced transform splitting process. For example, video encoder 20 and/or video decoder 30 may perform forced splitting any time a transform crosses a prediction partition boundary, such as an AMP motion boundary. When performing the forced splitting, video encoder 20 and/or video decoder 30 may continue to split transforms until the resulting transforms do not span multiple prediction partitions (e.g., the transforms correspond to exactly one prediction partition). In this way, video encoder 20 and/or video decoder 30 may use the largest transforms that do not cross a prediction partition boundary.

With respect to determining whether to split the one or more non-square transforms based on the non-square transforms being non-square, according to aspects of this disclosure, video encoder 20 and/or video decoder may adhere to one or more predetermined rules to simplify application of the non-square transforms. In one example, video encoder 20 and/or video decoder may refrain from splitting a non-square transform. In other words, when video encoder 20 and/or video decoder determines that a TU has been split into at least one non-square TU, video encoder 20 and/or video decoder may determine that the non-square TU is not further split.

An example is shown in Table 1 below. Table 1 generally describes examples of permitted sizes of TUs for both luminance (Y) and chrominance (U, V) TUs, based on the size of a CU including the TUs. It is noted that chrominance blocks are typically downsampled by one-quarter pixel resolution relative to corresponding luminance blocks. Moreover, the RQT structure includes nodes at various depths corresponding to various TU sizes, where Depth 0 typically indicates that a parent TU (e.g., a parent luminance transform unit and/or parent chrominance transform unit) is not split, Depth 1 indicates that the parent TU is split once, and Depth 2 indicates that TUs at Depth 1 are further split. In accordance with the example described above, after a TU is split into one or more non-square TUs, the non-square TUs are not further split. Therefore, entries in Table 1 of "NA" may indicate that the corresponding depth is not available due to a parent TU being a non-square TU.

TABLE 1

| CU Size | 64X64 | | 32X32 | | 16X16 | |
|---|---|---|---|---|---|---|
| | Y | UV | Y | UV | Y | UV |
| Depth 0 | Na | Na | 32x32 | 16x16 | 16X16 | 8x8 |
| Depth 1 | 32x32 | 16x16 | 32x8 | 16x4 | 16x4 | 4x4 |
| Depth 2 | 32x8 | 16x4 | NA | NA | NA | NA |

In another example, a non-square transform may only be split into additional non-square transforms. That is, after splitting a TU into non-square transforms, video encoder 20 and/or video decoder may continue to split the non-square transforms into non-square transforms, but may not split the non-square transforms into square transforms. If a non-square TU cannot be further split into non-square TUs, e.g., due to a limitation on the minimum TU size, the splitting stops. An example is shown in Table 2 below:

TABLE 2

| CU Size | 64X64 | | 32X32 | | 16X16 | |
|---|---|---|---|---|---|---|
| | Y | UV | Y | UV | Y | UV |
| Depth 0 | Na | Na | 32X32 | 16x16 | 16X16 | 8x8 |
| Depth 1 | 32x32 | 16x16 | 32x8 | 16x4 | 16x4 | 4x4 |
| Depth 2 | 32x8 | 16x4 | 16x4 | NA | NA | NA |

In another example, the rule of splitting non-square TUs only into further non-square TUs (of the previous example) may only be applied to luminance ("luma") components of video data. An example is shown in Table 3 below:

TABLE 3

| CU Size | 64X64 | | 32X32 | | 16X16 | |
|---|---|---|---|---|---|---|
| | Y | UV | Y | UV | Y | UV |
| Depth 0 | Na | Na | 32X32 | 16x16 | 16X16 | 8x8 |
| Depth 1 | 32x32 | 16x16 | 32x8 | 16x4 | 16x4 | 4x4 |
| Depth 2 | 32x8 | 16x4 | 16x4 | 4x4 | NA | NA |

In yet another example, the rules of the above examples may be adaptively applied. For example, video encoder 20 and/or video decoder may apply the predetermined rules of non-square transforms based on one or more of CU size, picture type, picture resolution, block type, or the like, as described in greater detail below.

Figure 2:
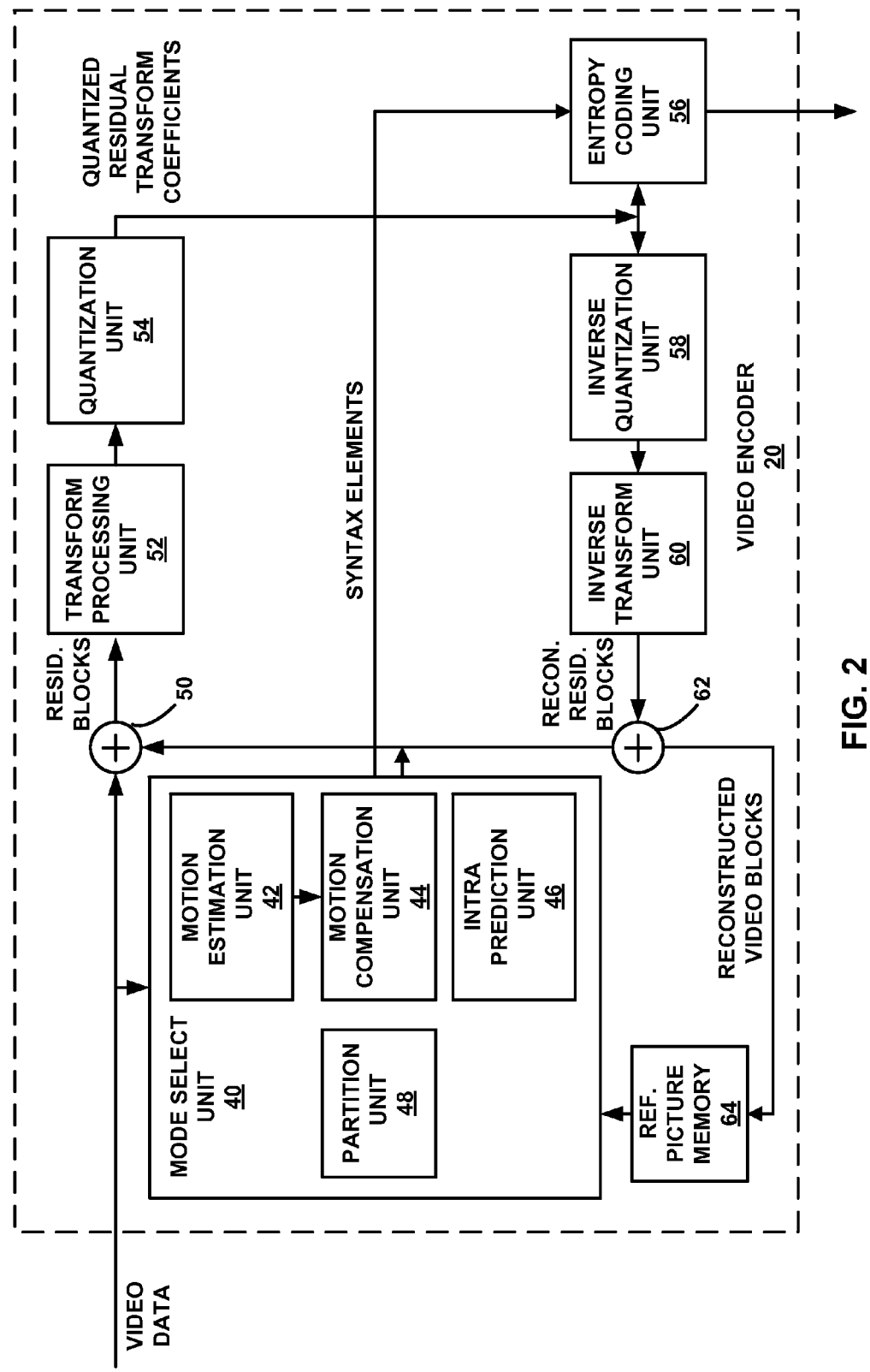
FIG. 2 is a block diagram illustrating an example of a video encoder that may implement techniques for applying transforms in video coding.

FIG. 2 is a block diagram illustrating an example of video encoder 20 that may implement techniques for applying transforms in video coding. Video encoder 20 may perform intra- and inter-coding of video blocks within video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video picture to be encoded. In the example of FIG. 2, video encoder 20 includes mode select unit 40, reference picture memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal prediction. Intra-prediction unit 46 may alternatively perform intra-predictive coding of the received video block relative to one or more neighboring blocks in the same picture or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

In some examples, transform processing unit 52 may apply square transforms as well as non-square transforms. In addition, transform processing unit 52 may synchronized chroma transforms with a corresponding luma transform. Accordingly, if a luma transform block is split, whenever possible, a corresponding chroma transform block may also be split. Transform processing unit 52 may also apply limitations on the minimum size of the transform that is applied. For example, transform processing unit 52 may apply a minimum sized 4×N transform, so a 16×4 block may be split into four 4×4 transforms, instead of 2×8 transforms. Table 4 provides one example of transform splitting for non-square transforms:

TABLE 4

| CU Size | 64X64 | | 32X32 | | 16X16 | |
|---|---|---|---|---|---|---|
| | Y | UV | Y | UV | Y | UV |
| Depth 0 | Na | Na | 32X32 | 16x16 | 16X16 | 8x8 |
| Depth 1 | 32x32 | 16x16 | 32x8 | 16x4 | 16x4 | 4x4 |
| Depth 2 | 32x8 | 16x4 | 16x4 | 4x4 | 4x4 | NA |

According to aspects of this disclosure, transform processing unit 52 may determine transforms such that the transforms do not cross a prediction partition boundary. That is, according to aspects of this disclosure, transform processing unit 52 may apply square transforms to a PU having one or more non-square partitions, such that the transforms are not applied to more than one prediction partition.

In some instances, the techniques may be implemented in conjunction with a forced transform splitting process. For example, transform processing unit 52 may perform forced splitting any time a transform crosses a prediction partition boundary, such as an AMP motion boundary. When performing the forced splitting, transform processing unit 52 may continue to split transforms until the resulting transforms do not span multiple prediction partitions (e.g., the transforms correspond to exactly one prediction partition).

According to some examples, transform processing unit 52 may only perform forced TU splitting for some color components. For example, transform processing unit 52 may only apply a forced transform split to a luma color component of a picture. In this example, transform processing unit 52 may apply a 2N×2N transform to the chroma color components, regardless of the associated prediction partitioning of the block being coded. In another example, transform processing unit 52 may apply a different forced split scheme to the chroma color components.

Transform processing unit 52 may adaptively perform forced transform splitting in accordance with the techniques of this disclosure. For example, forced transform splitting may be enabled or disabled based on a coding characteristic associated with the video data. In this example, the coding characteristics for determining whether to force a transform split may include a block size, a picture type, a picture size, a block mode (e.g., inter/intra, P/B/I), a motion vector amplitude, a reference index, or a variety of other characteristics.

According to other aspects of this disclosure, transform processing unit 52 may additionally or alternatively adhere to one or more predetermined rules to simplify application of the non-square transforms. In one example, transform processing unit 52 may refrain from splitting a non-square transform. That is, upon splitting a TU into at least one non-square TU, transform processing unit 52 may not further split the non-square transforms. According to this example, transform processing unit 52 may apply the transform splitting restrictions shown in Table 1 above.

In another example, transform processing unit 52 may split a non-square transform only into additional non-square transforms. That is, after splitting a TU into non-square transforms, transform processing unit 52 may continue to split the non-square transforms into non-square transforms, but may not split the non-square transforms into square transforms. If a non-square TU cannot be further split into non-square TUs, e.g., due to a limitation on a TU size, transform processing unit 52 may not split the TU further. According to this example, transform processing unit 52 may apply the transform splitting restrictions shown in Table 2 above.

In still another example, transform processing unit 52 may apply transform splitting restrictions based on a color component of the video data being coded. For example, transform processing unit 52 may apply the transform restrictions described above to luma components of video data, but may apply different transform splitting restrictions (or no restrictions) to chroma components. According to this example, transform processing unit 52 may apply the transform splitting restrictions shown in Table 2 above.

In still another example, transform processing unit 52 may adaptively apply transform splitting restrictions. For example, transform processing unit 52 may apply the transform splitting restrictions described above based on one or more of CU size, picture type, picture resolution, block type, or other factors associated with the video information. That is, for example, transform processing unit 52 may apply a first set of transform splitting restrictions to CUs that are 64×64 in size and a second, different set of transform splitting restrictions to CUs that are 32×32 in size. Other factors could also weigh into the splitting restrictions, including picture type, picture resolution, block type, or other factors.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent picture.

Figure 3:
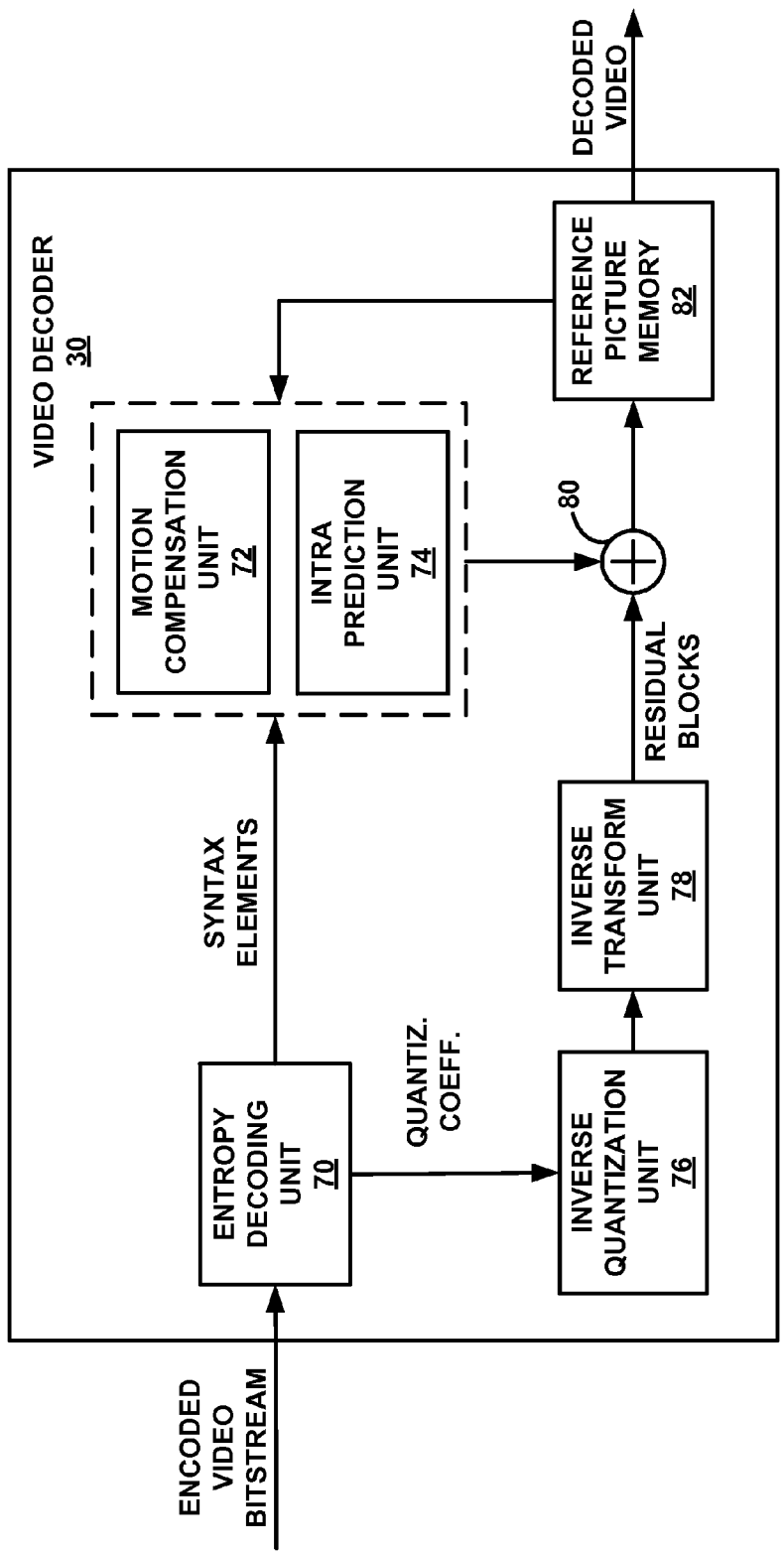
FIG. 3 is a block diagram illustrating an example of a video decoder that may implement techniques for applying transforms in video coding.

FIG. 3 is a block diagram illustrating an example of video decoder 30 that may implement techniques for applying transforms in video coding. In the example of FIG. 3, video decoder 30 includes an entropy decoding unit 70, motion compensation unit 72, intra prediction unit 74, inverse quantization unit 76, inverse transformation unit 78, reference picture memory 82 and summer 80.

By way of background, video decoder 30 may receive compressed video data that has been compressed for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

During the decoding process, video decoder 30 receives an encoded video bitstream that represents video blocks of an encoded video slice and associated syntax elements. In general, entropy decoding unit 70 entropy decodes the bitstream to generate quantized coefficients, motion vectors, and other syntax elements. Video decoder 30 may receive the syntax elements at the video slice level and/or the video block level.

For example, when the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. For example, video decoder 30 may reconstruct a two-dimensional block of transform coefficients from an encoded bitstream. Inverse transform unit 78 may apply an inverse transform to a reconstructed block of transform coefficients to produce a residual block in the pixel domain. As described in this disclosure, a "transform" may generally refer to either of a forward transform (e.g., as applied by transform processing unit 52 (FIG. 2)) or an inverse transform (e.g., as applied by inverse transform unit 60 (FIG. 2) or inverse transform unit 78).

Inverse transform unit 78 may determine and apply similar transform partitioning process as that described above with respect to transform processing unit 52. In some instances, inverse transform unit 78 may apply the same process as transform processing unit 52 (FIG. 2) for determining a transform partitioning structure (e.g., an RQT). In other instances, inverse transform unit 78 may determine an RQT for a block based on received signaling, e.g., in an encoded bitstream.

In any case, according to aspects of this disclosure, inverse transform unit 78 may determine transforms such that the transforms do not cross a prediction partition boundary. That is, according to aspects of this disclosure, inverse transform unit 78 may apply square transforms to a PU having one or more non-square partitions, such that the transforms are not applied to more than one prediction partition.

In some instances, the techniques may be implemented in conjunction with a forced transform splitting process. For example, inverse transform unit 78 may perform forced splitting any time a transform crosses a prediction partition boundary, such as an AMP motion boundary. When performing the forced splitting, inverse transform unit 78 may continue to split transforms until the resulting transforms do not span multiple prediction partitions (e.g., the transforms correspond to exactly one prediction partition).

According to some examples, inverse transform unit 78 may only perform forced TU splitting for some color components. For example, inverse transform unit 78 may only apply a forced transform split to a luma color component of a picture. In this example, inverse transform unit 78 may apply a 2N×2N transform to the chroma color components, regardless of the associated prediction partitioning of the block being coded. In another example, inverse transform unit 78 may apply a different forced split scheme to the chroma color components.

Inverse transform unit 78 may adaptively perform forced transform splitting in accordance with the techniques of this disclosure. For example, forced transform splitting may be enabled or disabled based on a coding characteristic associated with the video data. In this example, the coding characteristics for determining whether to force a transform split may include a block size, a picture type, a picture size, a block mode (e.g., inter/intra, P/B/I), a motion vector amplitude, a reference index, or a variety of other characteristics.

According to other aspects of this disclosure, inverse transform unit 78 may additionally or alternatively adhere to one or more predetermined rules to simplify application of the non-square transforms. In one example, inverse transform unit 78 may refrain from splitting a non-square transform. That is, upon splitting a TU into at least one non-square TU, inverse transform unit 78 may not further split the non-square transforms. According to this example, inverse transform unit 78 may apply the transform splitting restrictions shown in Table 1 above.

In another example, inverse transform unit 78 may split a non-square transform only into additional non-square transforms. That is, after splitting a TU into non-square transforms, inverse transform unit 78 may continue to split the non-square transforms into non-square transforms, but may not split the non-square transforms into square transforms. If a non-square TU cannot be further split into non-square TUs, e.g., due to a limitation on a TU size, inverse transform unit 78 may not split the TU further. According to this example, inverse transform unit 78 may apply the transform splitting restrictions shown in Table 2 above.

In still another example, inverse transform unit 78 may apply transform splitting restrictions based on a color component of the video data being coded. For example, inverse transform unit 78 may apply the transform restrictions described above to luma components of video data, but may apply different transform splitting restrictions (or no restrictions) to chroma components. According to this example, inverse transform unit 78 may apply the transform splitting restrictions shown in Table 2 above.

In still another example, inverse transform unit 78 may adaptively apply transform splitting restrictions. For example, inverse transform unit 78 may apply the transform splitting restrictions described above based on one or more of CU size, picture type, picture resolution, block type, or the like. That is, for example, inverse transform unit 78 may apply a first set of transform splitting restrictions to CUs that are 64×64 in size and a second, different set of transform splitting restrictions to CUs that are 32×32 in size.

Video decoder 30 forms a decoded video block by summing the residual blocks from inverse transform unit 78 with the corresponding predictive blocks generated by motion compensation unit 82. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

Figure 4A:
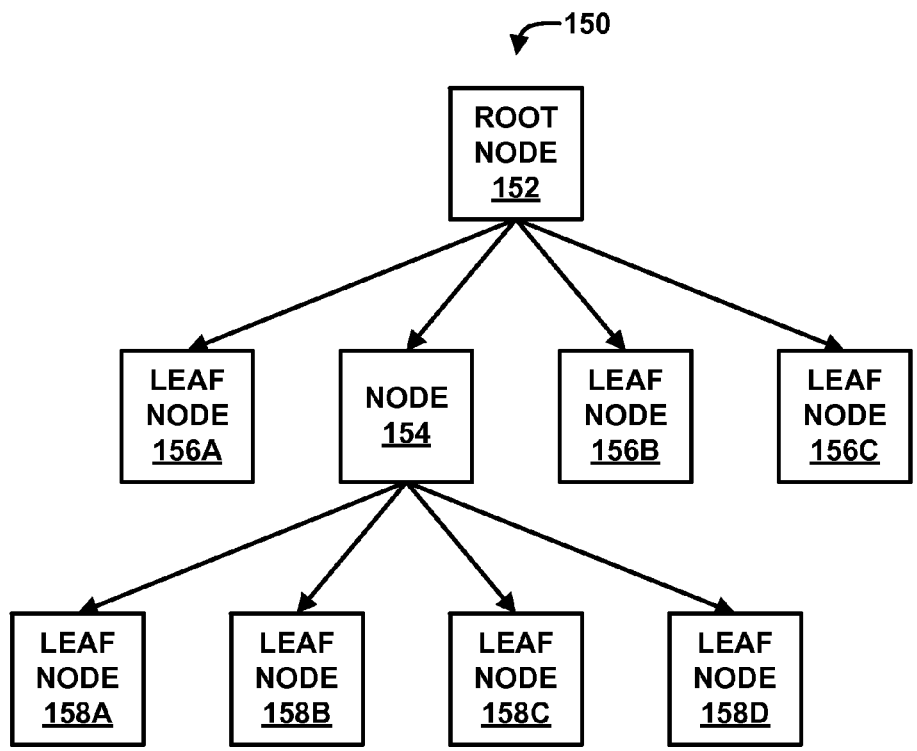
FIGS. 4A and 4B are conceptual diagrams illustrating an example quadtree and a corresponding largest coding unit (LCU).
Figure 4B:
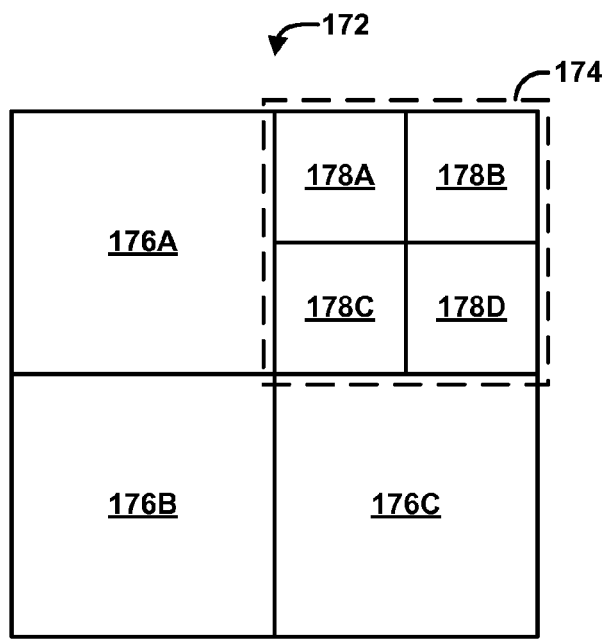

FIGS. 4A and 4B are conceptual diagrams illustrating an example quadtree 150 and a corresponding largest coding unit 172. FIG. 4A depicts an example quadtree 150, which includes nodes arranged in a hierarchical fashion. Quadtree 150 may be associated with, for example, a treeblock according to the proposed HEVC standard. Each node in a quadtree, such as quadtree 150, may be a leaf node with no children, or have four child nodes. In the example of FIG. 4A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding LCU, such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split_flag values may be 101000000.

As noted above, CU depth may refer to the extent to which an LCU, such as LCU 172 has been divided. For example, root node 152 may correspond to CU depth zero, while node 154 and leaf nodes 156 may correspond to CU depth one. In addition, leaf nodes 158 may correspond to CU depth two.

While FIG. 4A illustrates an example of a CU quadtree, it should be understood that a similar quadtree may be applied to TUs of a leaf-node CU. That is, a leaf-node CU may include a TU quadtree (referred to as a residual quad tree (RQT)) that describes partitioning of TUs for the CU. A TU quadtree may generally resemble a CU quadtree, except that the TU quadtree may signal intra-prediction modes for TUs of the CU individually.

According to aspects of this disclosure, a video coder (such as video encoder 20 or video decoder 30) may perform transform splitting according to the recursive structure shown in FIGS. 4A and 4B, such that transforms are not applied across a prediction partition boundary. For example, as described in greater detail below, the video coder may apply divide a TU of a block of video data into square sub-blocks, such that transforms are not applied to more than one prediction partition associated with the block.

In some instances, the techniques may be implemented in conjunction with a forced transform splitting process. For example, the video coder may perform forced transform splitting any time a transform crosses a prediction partition boundary, such as an AMP motion boundary (e.g., as described below with respect to FIG. 6). When performing the forced splitting, the video coder may continue to split transforms according to an RQT structure until the resulting transforms do not span multiple prediction partitions (e.g., the transforms correspond to exactly one prediction partition).

Figure 5:
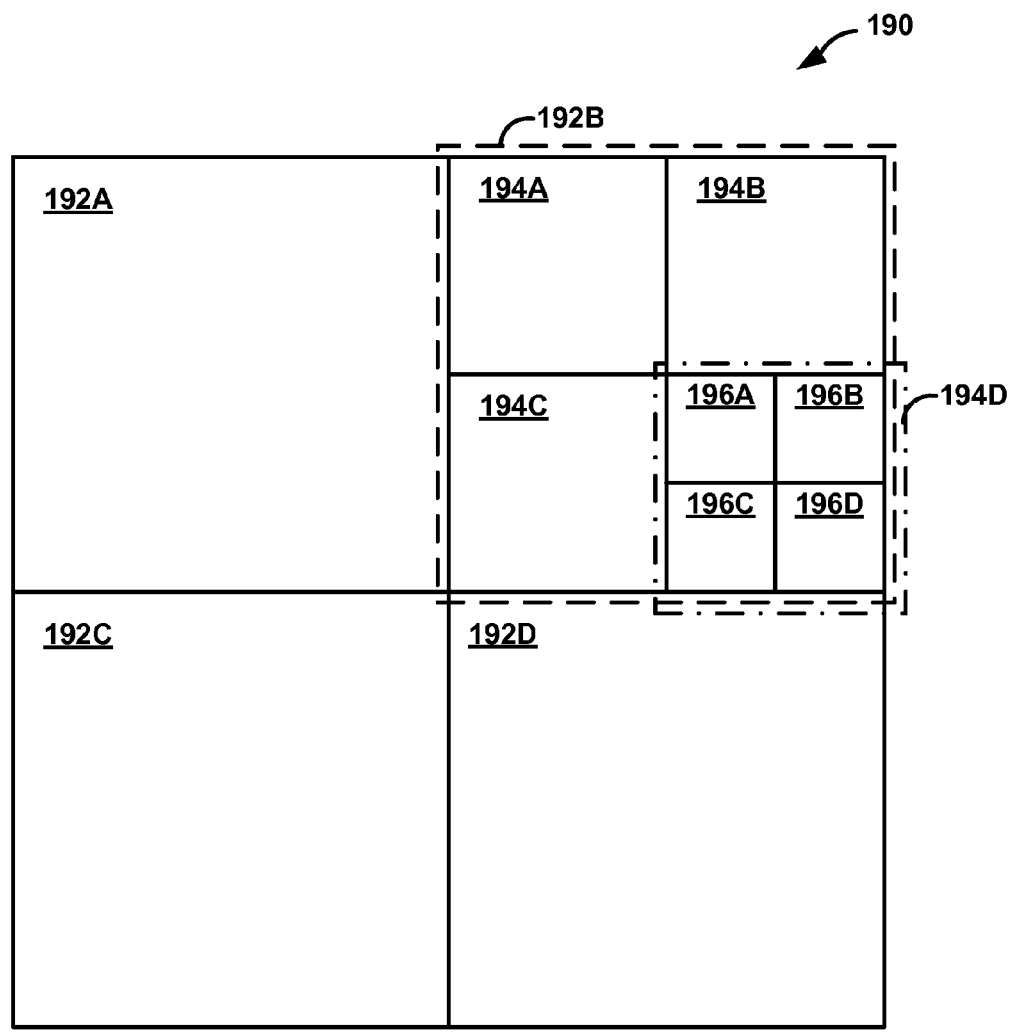
FIG. 5 is a conceptual diagram illustrating an example block partitioned into various sub-blocks.

FIG. 5 is a conceptual diagram illustrating an example block 190 partitioned into various sub-blocks. In the example shown in FIG. 5, there are three levels of transform decompositions. With a level 1 (depth 1) decomposition, the whole transform block is split into four quarter-sized blocks. Then at level 2 (depth 2), the second quarter-sized transform block is further split into four $\frac{1}{16}$ sized transform blocks. Then at level 3 (depth 3), the fourth $\frac{1}{16}$ sized transform block is further split into four even smaller transform blocks. In practice, whether a transform block needs to be further split is determined based on, for example, a rate-distortion optimization.

Block 190 represents an example of a TU, and the partitioning of block 190 represents an example partitioning using a quadtree. In the case that block 190 represents a TU, a corresponding quadtree may comprise a residual quadtree (RQT). In this example, level 0 partitioning, corresponding to a root node of the RQT, would correspond to block 190. Level 1 partitioning, that is, nodes of the RQT immediately below the root node, may correspond to sub-blocks 192A-192D (sub-blocks 192). Level 2 partitioning, that is, nodes of the RQT immediately below level 1 nodes, may correspond to sub-blocks 194A-194D. In this example, only sub-block 192B is partitioned at level 1. Therefore, nodes in the RQT corresponding to sub-blocks 192A, 192C, and 192D may be considered leaf nodes, that is, nodes without child nodes.

In this example, sub-block 194D is further partitioned into sub-blocks 196A-196D. Again, nodes in the RQT corresponding to blocks 194A, 194B, and 194C may be considered leaf nodes. Likewise, nodes in the RQT corresponding to sub-blocks 196A-196D may be considered leaf nodes as well.

Figure 12:
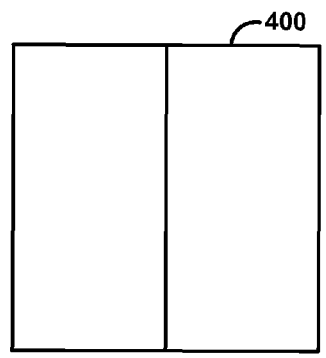
FIG. 12 illustrates an example TU decomposition for a 64×64 coding unit (CU).
Figure 12:
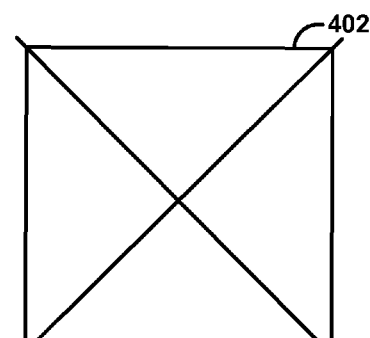
Figure 12:
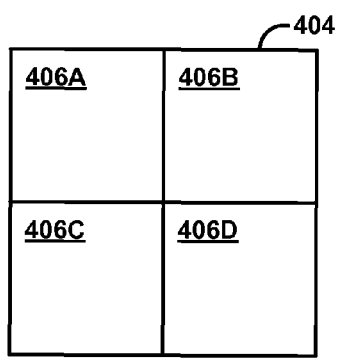
Figure 12:
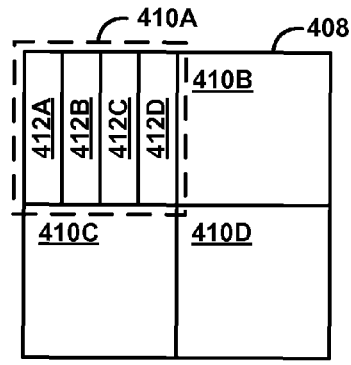
Figure 13:
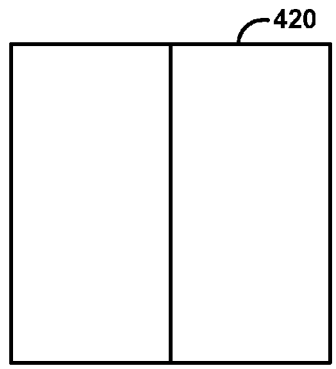
FIG. 13 illustrates an example TU decomposition for a 32×32 CU.
Figure 13:
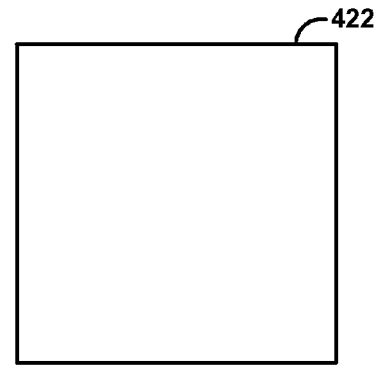
Figure 13:
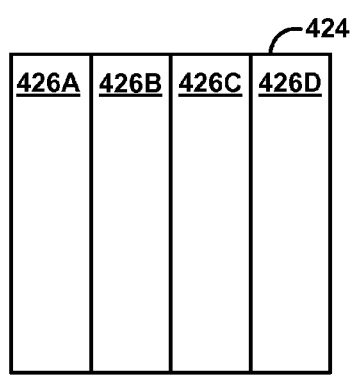
Figure 13:
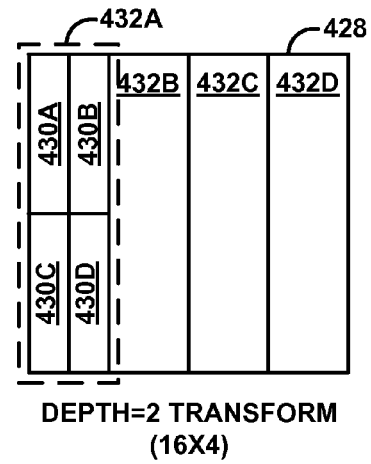
Figure 14:
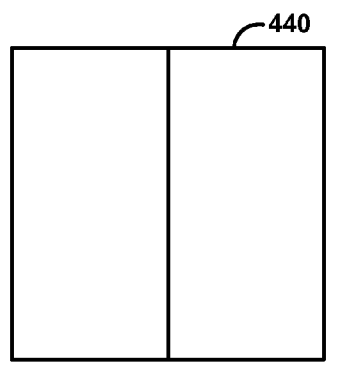
FIG. 14 illustrates an example TU decomposition for a 16×16 CU.
Figure 14:
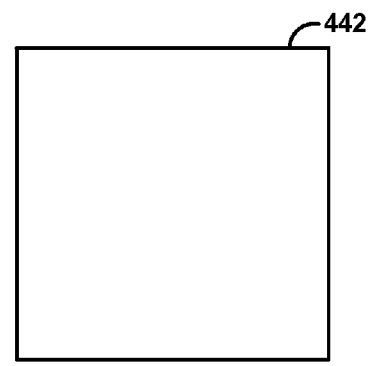
Figure 14:
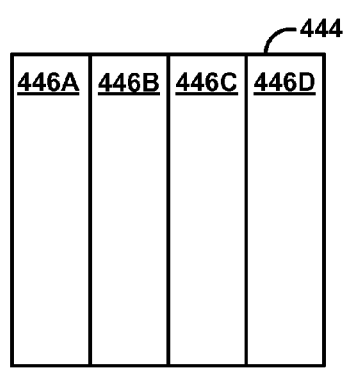
Figure 14:
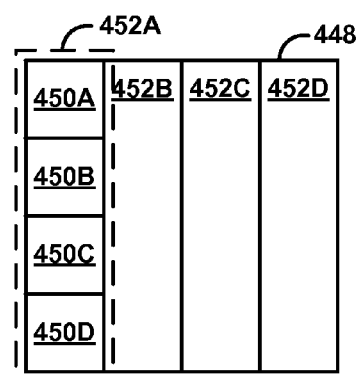

Although each of the blocks of FIG. 5 is square shaped, it should be understood that a video coder may also split TUs into non-square shapes, in some examples. FIGS. 12-14 illustrate various examples of non-square TUs. A recursive quad-tree structure for non-square transforms may be applied to the blocks as shown in the examples of FIGS. 12-14, or similar blocks, for various CU sizes with non-square PUs, such as N×2N PUs or 2N×N PUs.

As noted above, according to aspects of this disclosure, a video coder (such as video encoder 20 or video decoder 30) may perform transform splitting, as shown in the RQT example of FIG. 5, such that transforms are not applied across a prediction partition boundary. For example, as described in greater detail below, the video coder may apply divide a TU of a block of video data into square sub-blocks, such that transforms are not applied to more than one prediction partition associated with the block.

In some instances, the techniques may be implemented in conjunction with a forced transform splitting process. For example, the video coder may perform forced transform splitting any time a transform crosses a prediction partition boundary, such as an AMP motion boundary (e.g., as described below with respect to FIG. 6). When performing the forced splitting, the video coder may continue to split transforms according to an RQT structure until the resulting transforms do not span multiple prediction partitions (e.g., the transforms correspond to exactly one prediction partition).

Figure 6:
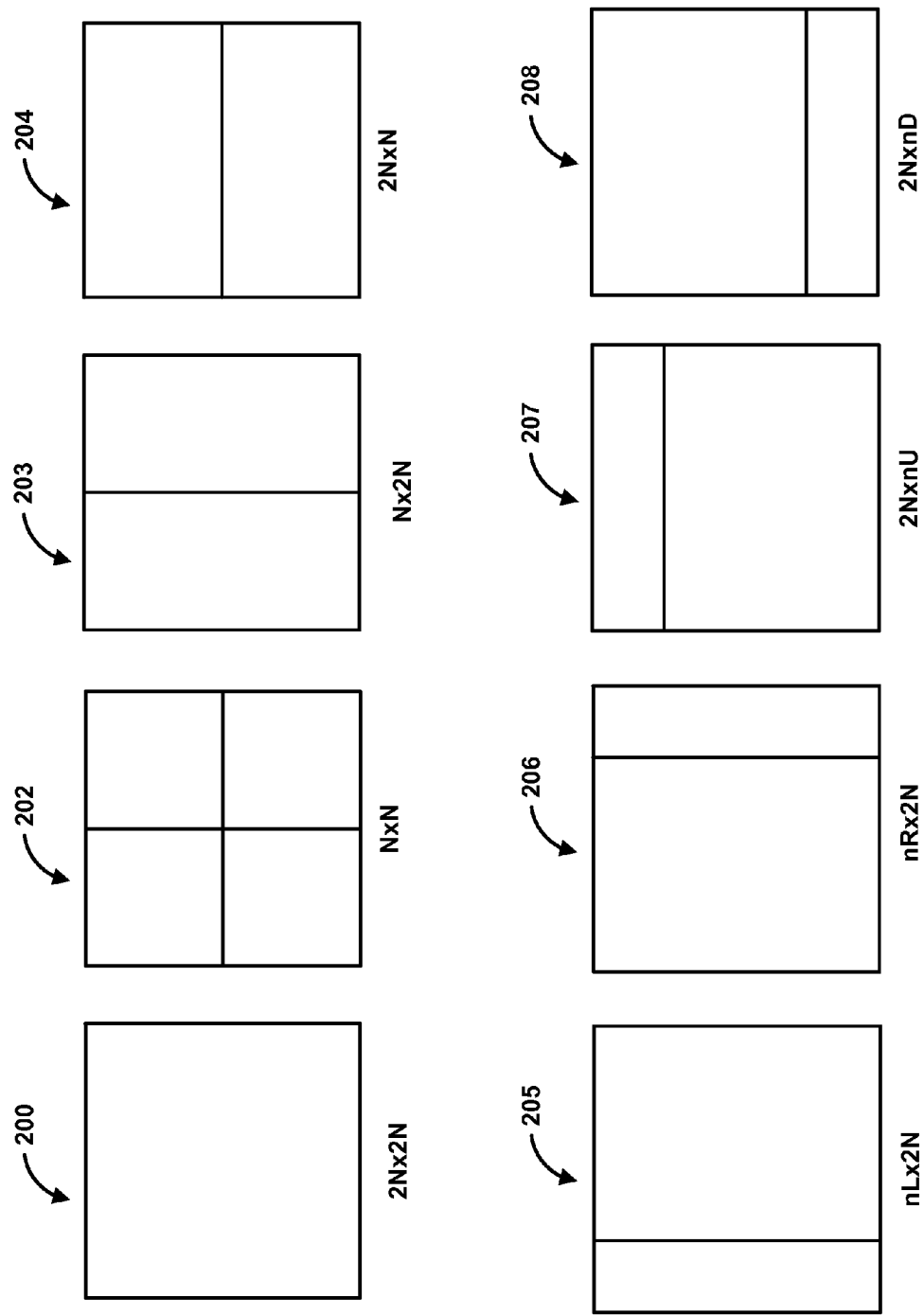
FIG. 6 generally illustrates partitioning modes that may be associated with prediction units.

FIG. 6 generally illustrates partitioning modes that may be associated with PUs. For example, assuming the size of a particular CU is 2N×2N, the CU may be predicted using partition modes 2N×2N (200), N×N (201), N×2N (202), 2N×N (203), nL×2N (204), nR×2N (205), 2N×nU (206), and 2N×nD (207), thereby defining prediction partitions. The partition modes shown in the example of FIG. 6 are presented for purposes of illustration only, and other partition modes may be used to indicate the manner in which video data is predicted.

In some instances, a video coder (e.g., such as video encoder 20 and/or video decoder 30) may perform intra-prediction or inter-prediction using partition modes 200 and 201. For example, the video coder may predict a CU as a whole using the 2N×2N PU (partition mode 200). In another example, the video coder may predict the CU using four N×N sized PUs (partition mode 201), with each of the four sections having a potentially different prediction technique being applied.

With respect to inter-coding, in addition to the symmetric partition modes 200 and 201, the video coder may implement a side-by-side arrangement of PUs (partition modes 203 and 204), or a variety of asymmetric motion partition AMP modes. With respect to the AMP modes, the video coder may asymmetrically partition a CU using partition modes nL×2N (205), nR×2N (206), 2N×nU (207), and 2N×nD (208). In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right."

According to aspects of this disclosure, a video coder (such as video encoder 20 or video decoder 30) may perform transform splitting so that transforms are not applied across a prediction partition boundary, such as the prediction partition boundaries shown in FIG. 6 for partition mode 201, 202, 203, 204, 205, 206, and 207. For example, as described in greater detail below with respect to FIG. 9, the video coder may apply divide a TU of a block of video data into square sub-blocks, such that transforms are not applied to more than one prediction partition associated with the block.

In some instances, the techniques may be implemented in conjunction with a forced transform splitting process. For example, the video coder may perform forced transform splitting any time a transform crosses a prediction partition boundary. That is, with respect to FIG. 6, the video coder may continue to split a TU into smaller sub-TUs until transforms are not applied across the prediction partition boundaries associated with asymmetrically prediction partition modes nL×2N (205), nR×2N (206), 2N×nU (207), and 2N×nD (208).

Figure 7:
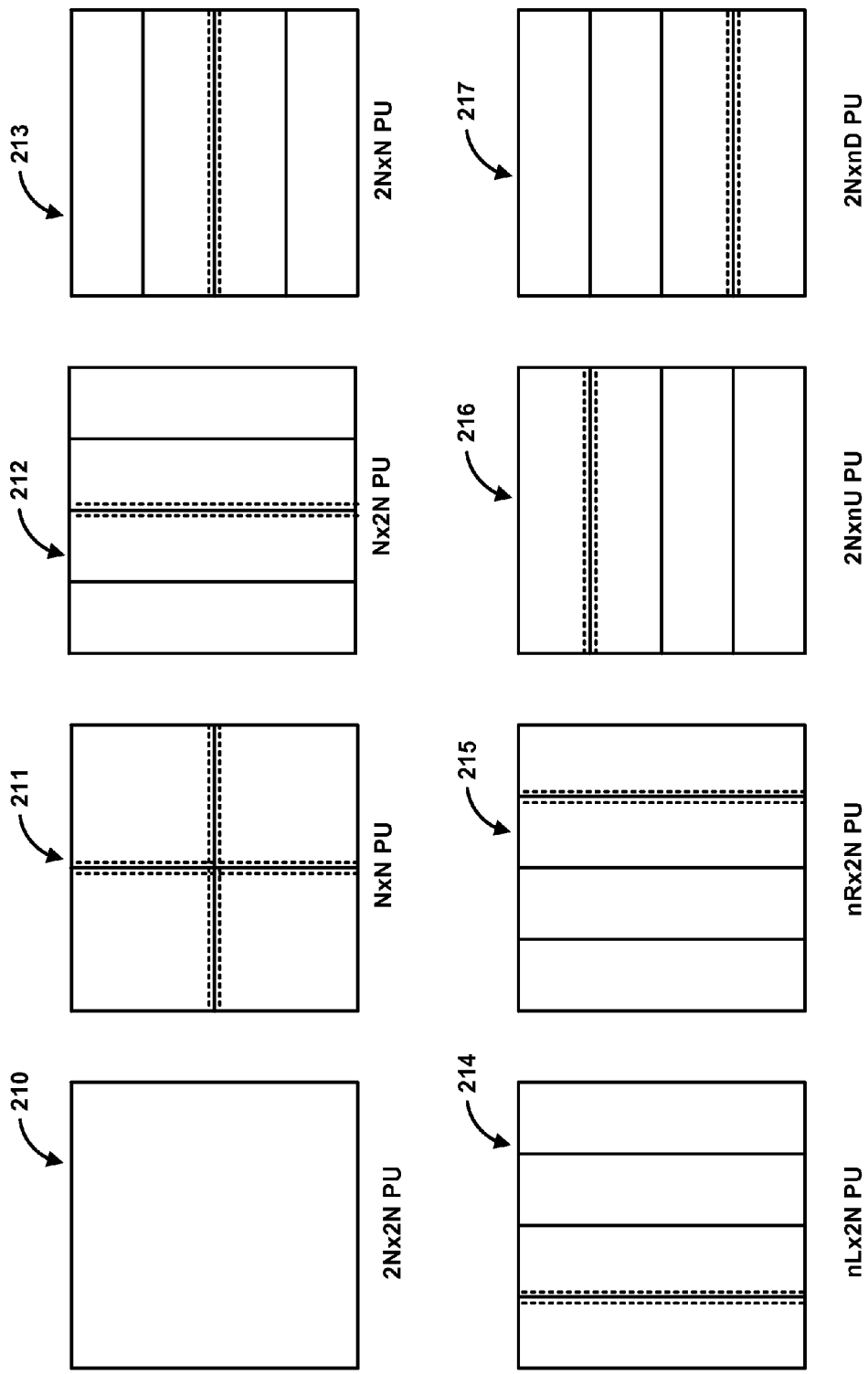
FIG. 7 illustrates an example of forced transform splitting for the prediction units shown in FIG. 6.

FIG. 7 illustrates an example of forced transform splitting for the prediction partitions shown in FIG. 6. For example, assuming the size of a particular CU is 2N×2N, FIG. 7 illustrates prediction partitions with a dashed lined (or with two offset dashed lines in instances in which a solid line and a dashed line overlap), including prediction partitions resulting from partition modes 2N×2N (210), N×N (211), N×2N (212), 2N×N (213), nL×2N (214), nR×2N (215), 2N×nU (216), and 2N×nD (217).

FIG. 7 also illustrates forced transform splitting applied to the prediction partitions. For example, as noted above, in some instances, a video encoder (such as video encoder 20) may implement a maximum RQT depth. The maximum RQT depth may be implemented to simplify coding. For example, if a maximum RQT depth is set to 1, there may be only one transform choice, e.g., a depth 0 transform 210. Limiting the maximum RQT depth in this way may reduce the potential computations associated with applying transforms (e.g., such as rate-distortion computations) and/or signaling associated with the RQT. Video encoder 20 may signal the maximum RQT depth using high level syntax in an encoded bitstream, which may be decoded and implemented by a video decoder (such as video decoder 30).

However, in instances in which a PU has been split, a video coder may perform forced transform splitting. For example, to prevent a transform from being applied to two different prediction partitions, the video coder may override the maximum RQT depth and perform a single transform split (e.g., splitting a single transform into four equally sized transforms).

In this way, FIG. 7 illustrates forced transform splitting with non-square transforms, such that non-square transforms are applied partitions 212-217. However, as described below with respect to FIG. 8, in some instances, non-square transforms may not be available (e.g., not enabled by a particular standard or profile/level of a standard).

Figure 8:
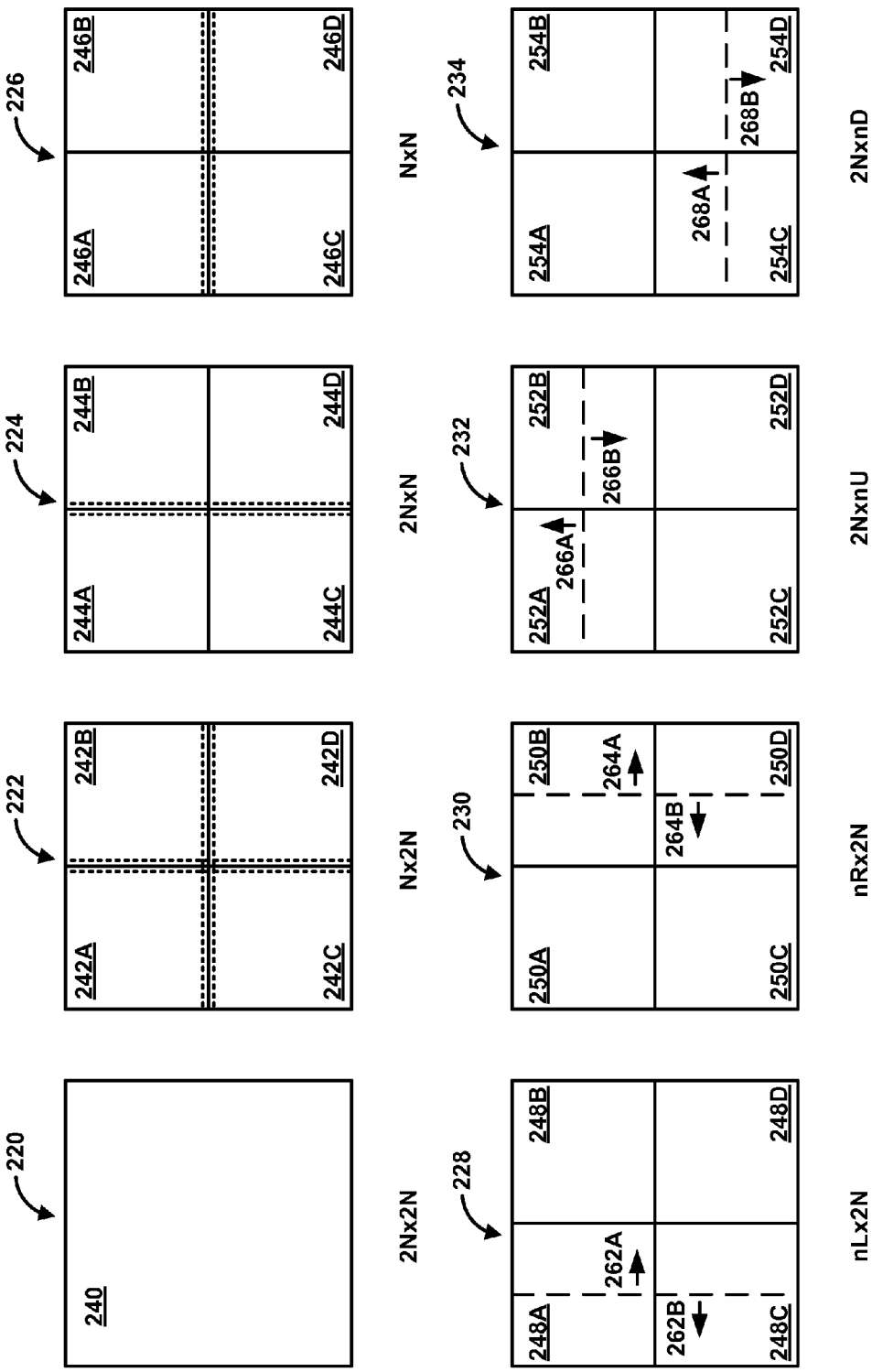
FIG. 8 illustrates another example of forced transform splitting for the prediction units shown in FIG. 6.

FIG. 8 illustrates another example of forced transform splitting for the prediction partitions shown in FIG. 6. For example, assuming the size of a particular CU is 2N×2N, FIG. 8 illustrates prediction partitions with a dashed lined (or with two offset dashed lines in instances in which a solid line and a dashed line overlap), including prediction partitions resulting from partition modes 2N×2N (220), N×N (222), N×2N (224), 2N×N (226), nL×2N (228), nR×2N (230), 2N×nU (232), and 2N×nD (234).

FIG. 8 also illustrates forced transform splitting applied to the prediction partitions. For example, as noted above, in some instances, a video encoder (such as video encoder 20) may implement a maximum RQT depth. The maximum RQT depth may be implemented to simplify coding. For example, if a maximum RQT depth is set to 1, there may be only one transform choice, e.g., a depth 0 transform 240. As noted above, limiting the maximum RQT depth in this way may reduce the potential computations associated with applying transforms (e.g., such as rate-distortion computations) and/or signaling associated with the RQT.

However, in instances in which a PU has been split, a video coder may perform forced transform splitting. For example, to prevent a transform from being applied to two different prediction partitions, the video coder may override the maximum RQT depth and perform a single transform split (e.g., splitting a single transform into four equally sized transforms).

As shown in FIG. 8, however, performing forced splitting in this way may still result in one transform being applied to two different prediction partitions. For example, non-square transforms may not be available for every video coding scheme. Moreover, some video coding schemes may prevent non-square transforms from being applied to reduce the complexity of the video coding process. For example, non-square transforms may be enabled or disabled according to a profile or level.

In the example of FIG. 8, the video coder may apply a single transform 240 (depth 0) to partition mode 2N×2N (220). The remaining partitions modes, however, split the blocks into more than one prediction partition. Accordingly, the video coder may apply a forced transform splitting process to the remaining blocks, including transforms 242A-242D (depth 1) to partition mode N×N (222), transforms 244A-244D (depth 1) to partition mode N×2N (224), transforms 246A-246D (depth 1) to partition mode 2N×N (226), transforms 248A-248D (depth 1) to partition mode nL×2N (228), transforms 250A-250D (depth 1) to partition mode nR×2N (230), transforms 252A-252D (depth 1) to partition mode 2N×nU (232), and transforms 254A-254D (depth 1) to partition mode 2N×nD (234).

In this example, applying the forced transform splitting process still results in a transform being applied to more than one prediction partition for AMP modes 228, 230, 232, and 234. For example, with respect to partition mode nL×2N (228), transforms 248A and 248B are applied to both a first prediction partition 262A and a second prediction partition 264A. That is, transforms 248A and 248B are applied across a prediction partition boundary (as demarcated by the dashed line). With respect to partition mode nR×2N (230), transforms 250B and 250D are applied to both a first prediction partition 264A and a second prediction partition 264B. With respect to partition mode 2N×nU (232), transforms 252A and 252B are applied to both a first prediction partition 266A and a second prediction partition 266B. With respect to partition mode 2N×nD (234), transforms 254C and 254D are applied to both a first prediction partition 268A and a second prediction partition 268B.

As noted above, applying transforms across prediction partition boundaries may impact coding efficiency. For example, a region of an image that includes multiple prediction partitions may indicate that there is a discontinuity in the region. Applying a single transform across the discontinuity, e.g., across the prediction partitions, may produce high frequency noise that impacts coding efficiency.

The prediction partitions and application of transforms shown in the example of FIG. 8 are presented for purposes of illustration only. Other partition modes may be used to indicate the manner in which video data is predicted, and other transforms may be applied to the resulting prediction partitions.

Figure 9:
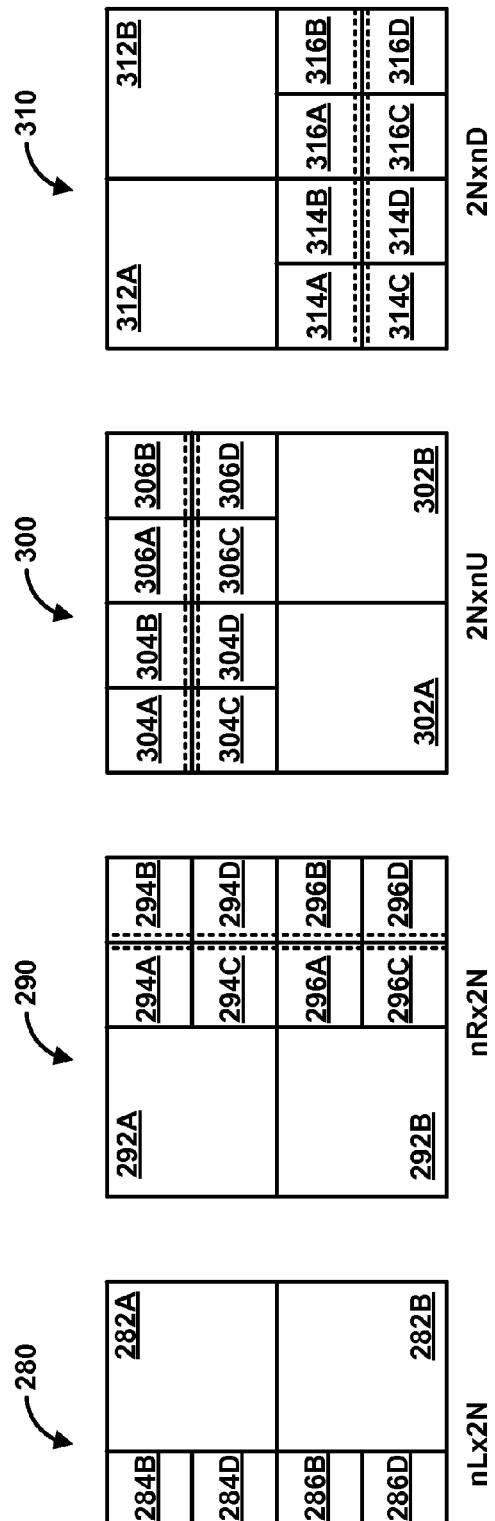
FIG. 9 illustrates an example of forced transform splitting, according to aspects of this disclosure.

FIG. 9 illustrates forced transform splitting, according to aspects of this disclosure. For example, assuming the size of a particular CU is 2N×2N, FIG. 9 illustrates prediction partitions with two offset dashed lines, including prediction partitions resulting from partition modes nL×2N (280), nR×2N (290), 2N×nU (300), and 2N×nD (310).

According to aspects of this disclosure, a video coder (such as video encoder 20 or video decoder 30) may apply transforms without applying transforms to more than one prediction partition. For example, the video coder may perform forced transform splitting until a transform is not applied to more than one prediction partition. That is, the video coder may determine one or more square transforms such that each of the one or more square transforms correspond to exactly one prediction partition.

As shown in the example of FIG. 9, the video coder may apply forced transform splitting so that transforms are constrained within AMP motion partitions. For example, FIG. 9 illustrates partition mode nL×2N (280) with associated depth 1 transforms 282A and 282B and depth 2 transforms 284A-284D and 286A-286D. In this example, the video coder may determine that the block includes more than one prediction partition. Accordingly, the video coder may split the associated TU, resulting in four depth 1 sub-TUs (including 282A and 282B). The video coder may also determine that one or more transforms still cross a prediction partition boundary (as shown the corresponding nL×2N predicted block of FIG. 8). Accordingly, the video coder may perform another transform split to split the sub-TUs that cross a prediction partition boundary, resulting in depth 2 sub-TUs 284A-284D and 286A-286D.

The video coder may apply the process described above for other prediction partitions. For example, FIG. 9 also illustrates partition mode nR×2N (290) with associated depth 1 transforms 292A and 292B and depth 2 transforms 294A-294D and 296A-296D, partition mode 2N×nU (300) with associated depth 1 transforms 302A and 302B and depth 2 transforms 304A-304D and 306A-306D, and partition mode 2N×nD with associated depth 1 transforms 312A and 312B and depth 2 transforms 314A-314D and 316A-316D.

In this way, the video coder splits transforms until each transform corresponds to exactly one prediction partition. While FIG. 9 illustrates splitting transforms to an RQT depth of 2, the techniques of this disclosure are not limited in this way. That is, in other examples, the video coder may perform more (or less) transform splitting, based on the prediction partitioning structure.

According to aspects of this disclosure, he video coder may select transforms so that the largest transforms that do not go across motion partition boundary are used. For example, as shown in FIG. 9, transforms are selected so that relatively smaller transforms (RQT depth 2 transforms) are applied to the asymmetric motion partition areas. That is, rather than splitting the entire block to depth 2 transforms, the video coder only applies transform splitting to TUs that cross prediction partition boundaries. In this example, one or more transforms applied to the block of data may be smaller than the lowest level of the RQT associated with the block (e.g., as signaled in an encoded bitstream). For example, the video coder may split a smallest TU of an RQT, such that the resulting TUs are smaller than the smallest TU of the RQT.

In some examples, the video coder may only apply the forced transform splitting shown in FIG. 9 to a sub-set of color components. For example, the video coder may only apply the forced transform splitting to the luma color component of a picture. In this example, the video coder may apply an un-split 2N×2N transform to the chroma color components of the picture, regardless of the arrangement of prediction partitions for a particular block. In other examples, the video coder may apply different forced splitting schemes to both luma and chroma color components.

According to aspects of this disclosure, the video coder may adaptively apply the forced splitting process shown in FIG. 9 based on a variety of factors. For example, the video coder may enable or disable forced transform splitting based on a coding characteristic associated with the video data, such as a block size, a picture type, a picture size, a block mode (inter/intra, P/B/I), a motion vector amplitude, a reference index.

Figure 10:
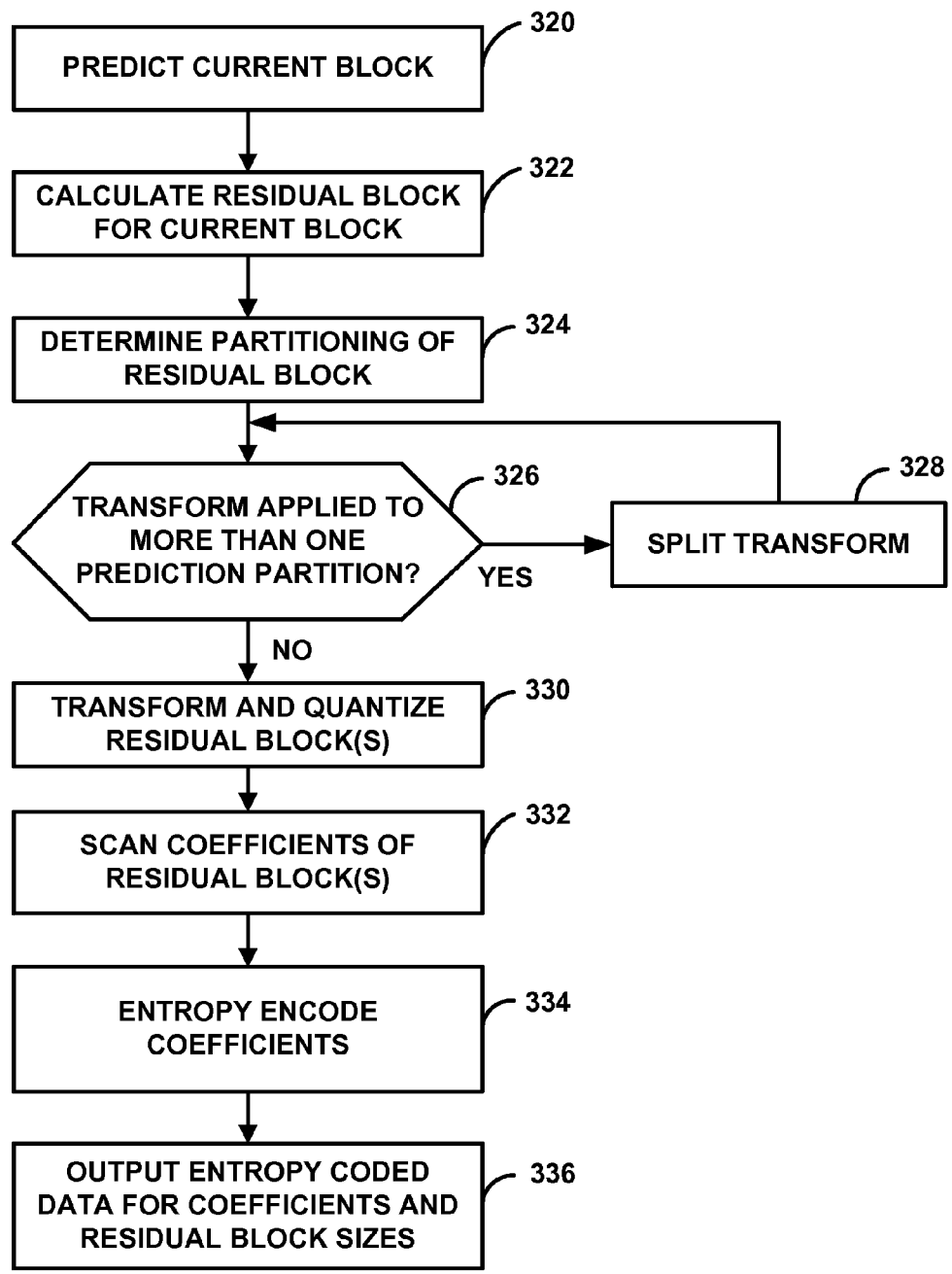
FIG. 10 illustrates an example process for encoding a block of video data, according to aspects of this disclosure.

FIG. 10 illustrates an example process for encoding a block of video data, according to aspects of this disclosure. The block may comprise a current CU or a portion of the current CU. Although described with respect to video encoder 20 (FIGS. 1 and 2), it should be understood that other devices may be configured to perform a method similar to that of FIG. 10.

In this example, video encoder 20 initially predicts the current block (320). For example, video encoder 20 may calculate one or more prediction units (PUs) for the current block. Video encoder 20 may also determine whether to use non-square PUs for the current block. For example, video encoder 20 may determine whether to apply an AMP mode to the block. Video encoder 20 may then calculate a residual block for the current block, e.g., to produce a transform unit (TU) (322). To calculate the residual block, video encoder 20 may calculate a difference between the original, uncoded block and the predicted block for the current block.

Video encoder 20 may also determine partitioning of the residual block into sub-blocks (324). For example, video encoder 20 may determine whether to partition a TU into one or more sub-TUs. Video encoder 20 may perform the partitioning determination recursively on each sub-TU, e.g., according to an RQT structure. In some instances, video encoder 20 may implement a maximum RQT depth, beyond which TUs are not further split.

According to aspects of this disclosure, video encoder 20 may determine whether a transform is applied to more than one prediction partition (326). For example, video encoder 20 may determine whether a TU is associated with more than one residual block, e.g., more than one of the determined PUs. In other words, video encoder 20 may determine whether a transform is applied across a prediction partition boundary.

If a transform is applied to more than one prediction partition, video encoder 20 may split the transform (328). In some examples, video encoder 20 may split the transform into four equally-sized transforms. That is, video encoder 20 may split the TU associated with more than one PU into sub-TUs in accordance with an RQT structure. Video encoder 20 may continue to split transforms that are associated with more than one residual block until each transform corresponds to exactly one prediction partition.

Video encoder 20 may then transform and quantize coefficients of the residual block(s) (330). Next, video encoder 20 may scan the quantized transform coefficients of the residual block(s) (332). During the scan, or following the scan, video encoder 20 may entropy encode the coefficients (334). For example, video encoder 20 may encode the coefficients using CAVLC or CABAC. In addition, video encoder 20 may code syntax elements indicating how the residual block (e.g., the parent TU corresponding to the CU) is partitioned, as well as whether to apply a maximum RQT depth.

Video encoder 20 may then output the entropy coded data of the block, including information indicating residual block sizes (336). In this manner, the method of FIG. 10 represents an example of a method including determining a prediction partitioning structure for predicting pixel values associated with a block of video data to form residual values, where the prediction partitioning structure includes one or more non-square partitions, determining a transform partitioning structure for applying one or more square transforms to the residual values, where the one or more square transforms are not applied to residual values associated with more than one prediction partition, and applying the one or more square transforms to the residual values according to the determined transform partitioning structure.

Figure 11:
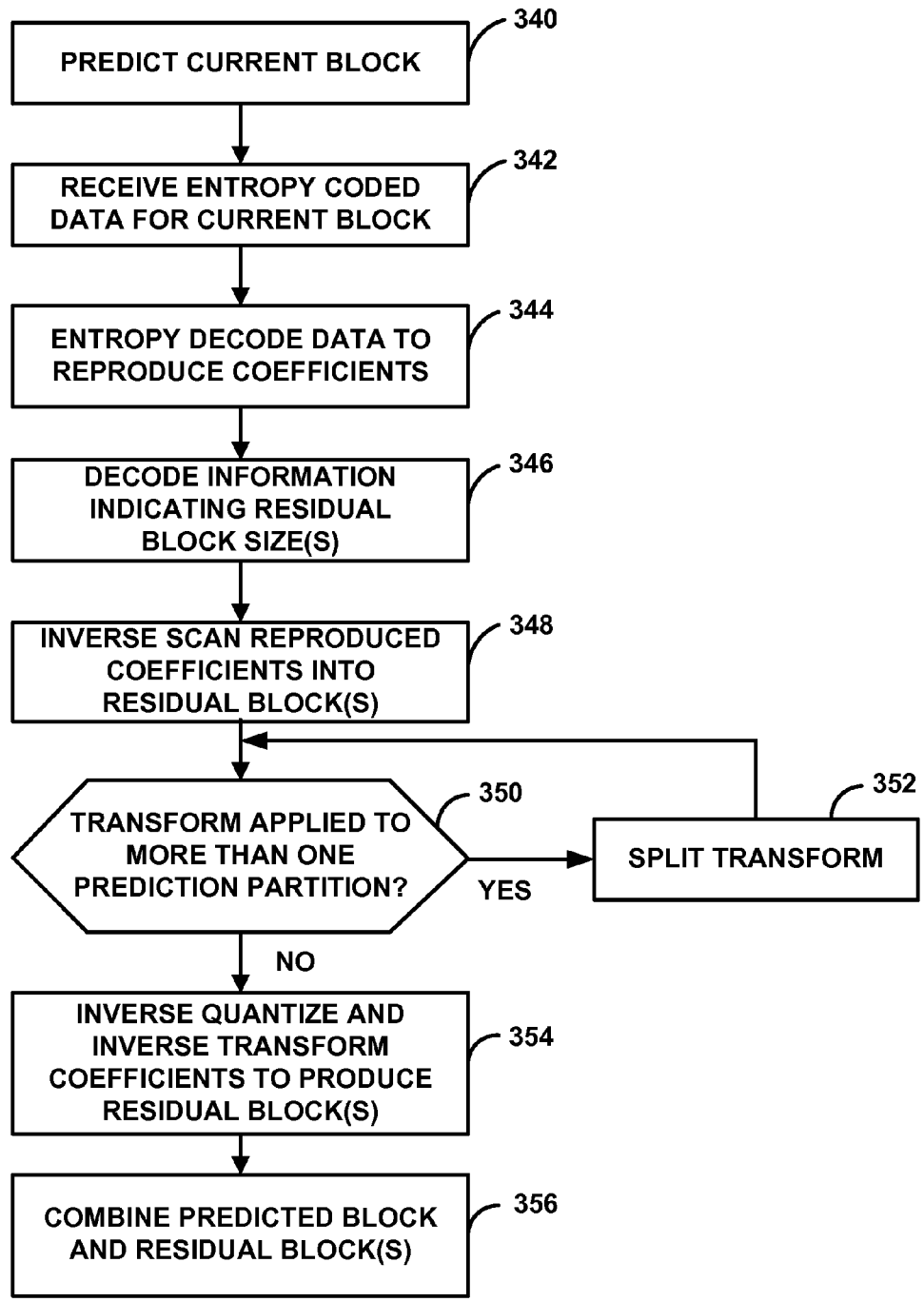
FIG. 11 illustrates an example process for decoding a block of video data, according to aspects of this disclosure.

FIG. 11 illustrates an example process for decoding a block of video data, according to aspects of this disclosure. The current block may comprise a current CU or a portion of the current CU. Although described with respect to video decoder 30 (FIGS. 1 and 3), it should be understood that other devices may be configured to perform a method similar to that of FIG. 11.

Video decoder 30 may predict the current block (340), e.g., using an intra- or inter-prediction mode to calculate a predicted block for the current block. Video decoder 30 may also receive entropy coded data for the current block, such as entropy coded data for coefficients of a residual block corresponding to the current block (342). For example, video decoder 30 may retrieve entropy coded data from an encoded bitstream. Video decoder 30 may entropy decode the entropy coded data to reproduce coefficients of the residual block (344).

Video decoder 30 may also decode information indicating sizes for one or more residual blocks, e.g., one or more TUs (346). In some examples, video decoder 30 may receive information regarding whether a TU for the block is split into one or more sub-TUs. Additionally or alternatively, video decoder 30 may receive an indication regarding a maximum RQT depth. Video decoder 30 may then inverse scan the reproduced coefficients (348), to create one or more blocks of quantized transform coefficients.

According to aspects of this disclosure, video decoder 30 may determine whether a transform is applied to more than one prediction partition (350). For example, video decoder 30 may determine whether a TU is associated with more than one residual block. In other words, video decoder 30 may determine whether a transform is applied across a prediction partition boundary.

If a transform is applied to more than one prediction partition, video decoder 30 may split the transform (352). In some examples, video decoder 30 may split the transform into four equally-sized transforms. That is, video decoder 30 may split the TU associated with more than one PU into sub-TUs in accordance with an RQT structure. Video decoder 30 may continue to split transforms that are associated with more than one residual block until each transform corresponds to exactly one prediction partition.

Video decoder 30 may then inverse quantize and inverse transform the coefficients to produce one or more residual blocks (354). Video decoder 30 may ultimately decode the current block by combining the predicted block and the residual block (356).

In this manner, the method of FIG. 11 represents an example of a method including determining a prediction partitioning structure for predicting pixel values associated with a block of video data to form residual values, where the prediction partitioning structure includes one or more non-square partitions, determining a transform partitioning structure for applying one or more square transforms to the residual values, where the one or more square transforms are not applied to residual values associated with more than one prediction partition, and applying the one or more square transforms to the residual values according to the determined transform partitioning structure.

FIG. 12 is a conceptual diagram illustrating an example TU decomposition for a 64×64 CU 400. The example decomposition of FIG. 12 generally corresponds to the process conventionally implemented in the HEVC standard, although such a decomposition may also be used with the techniques of this disclosure.

When a 64×64 CU includes non-square PUs, such as N×2N PUs, as in the example of CU 400, a corresponding TU may be partitioned in various ways. In some instances, the maximum size of TUs may be restricted to 32×32. In this example, a depth 0 TU 402 is not applicable, and a 64×64 CU may include at least four TUs.

In some examples, a video coder (such as video encoder 20 or video decoder) may split a TU into four 32×32 TUs, as in the example of TU 404 that has depth 1, indicating that TU 404 is split into four 32×32 TUs 406A-406D. The video coder may also further split the TUs. TU 408, for example, is split into four 32×32 TUs 410A-410D. Furthermore, TU 410A is further split into four non-square TUs 412A-412D. TUs 412A-412D may be non-square because the PUs of the corresponding CU are non-square, e.g., have a size of N×2N, as shown in block 400.

As shown in FIG. 12, in some instances, the video coder may use a combination of square transforms and non-square transforms. For example, the video coder may use square transforms for an inter-predicted block of size other than 2N×2N, and N×N. Alternatively, the video coder may use non-square transforms for a CU with a vertically partitioned motion boundary, e.g., a PU with SIZE_N×2N, SIZE_nL×2N, or SIZE_nR×2N. In this example, the video coder may use 0.5N×2N transforms. For a CU with horizontally partitioned motion boundary, e.g., a PU with SIZE_2N×N, SIZE_2N×nU, or SIZE_2N×nD, the video coder may use 2N×0.5N transforms.

FIG. 13 is a conceptual diagram illustrating an example TU decomposition for a 32×32 CU 420. In this example, a video coder (such as video encoder 20 or video decoder 30) may apply a TU 422 with depth 0, assuming a maximum TU size of 32×32. However, for a 32×32 CU with non-square PUs at depth 1, as in the example CU 420, the video coder may split a TU 424 into four non-square TUs, such as TUs 426A-426D. For a 32×32 CU with non-square PUs at depth 2, the video coder may split TU 428 into four non-square TUs 432A-432D at level 1 and further split the non-square TUs at level 2 into four further non-square TUs 430A-430D. In this example, non-square TUs 432A-432D have a size of 0.5N×2N, and non-square TUs 430A-430D have sizes of 0.25N×N.

In some examples, in accordance with the techniques of this disclosure, non-square TUs 430A-430D are not available. Thus, rather than determining whether TUs 432A-432D are further partitioned, the video coder may instead determine that because TUs 432A-432D are non-square, TUs 432A-432D are not further split. That is, the video coder may determine that TU 428 is not further split into TUs 430A-430D based on TUs 432A-432D being non-square.

In other examples, non-square TUs 430A-430D are available only because TUs 430A-430D are non-square and split from a parent non-square TU, e.g., TU 432A. That is, the video coder may only use the non-square TUs 430A-430D because the TUs are sub-TUs of a non-square TU. In still other examples, the video coder may analyze other factors, such as the size of the corresponding CU (e.g., CU 420), a picture type, a picture resolution, a block type for CU 420, or other factors, to determine whether TUs 430A-430D are available.

FIG. 14 is a conceptual diagram illustrating an example TU decomposition for a 16×16 CU 440. In this example, a TU 442 with depth 0 is available (which may have a size of 16×16), assuming a maximum TU size of 32×32. For a 16×16 CU with non-square PUs at depth 1, such as CU 440, a video coder (such as video encoder 20 or video decoder 30) may split TU 444 into four non-square TUs 446A-446D. In addition, for a 16×16 CU with non-square PUs at depth 2, the video coder may split TU 448 into four non-square TUs 452A-452D, and split non-square TUs at level 1 into four square TUs, such as TUs 450A-450D. In this example, non-square TUs 452A-452D have sizes of 0.5N×2N, and square TUs 450A-450D have sizes of 0.5N×0.5N (e.g., 4×4, in the case of a 16×16 (2N×2N) CU).

In some examples, in accordance with the techniques of this disclosure, square TUs 450A-450D are not available, because parent TU 452A is non-square. Thus, rather than determining whether TUs 452A-452D are further partitioned, the video coder may instead determine that because TUs 452A-452D are non-square, TUs 452A-452D are not further split. That is, the video coder may determine that TU 448 is not further split into TUs 450A-450D based on TUs 452A-452D being non-square. In other examples, the video coder may be configured to determine that non-square TUs can only be partitioned into further non-square TUs. In these examples, TUs 450A-450D would also not be available, because TUs 450A-450D are square shaped.

Figure 15:
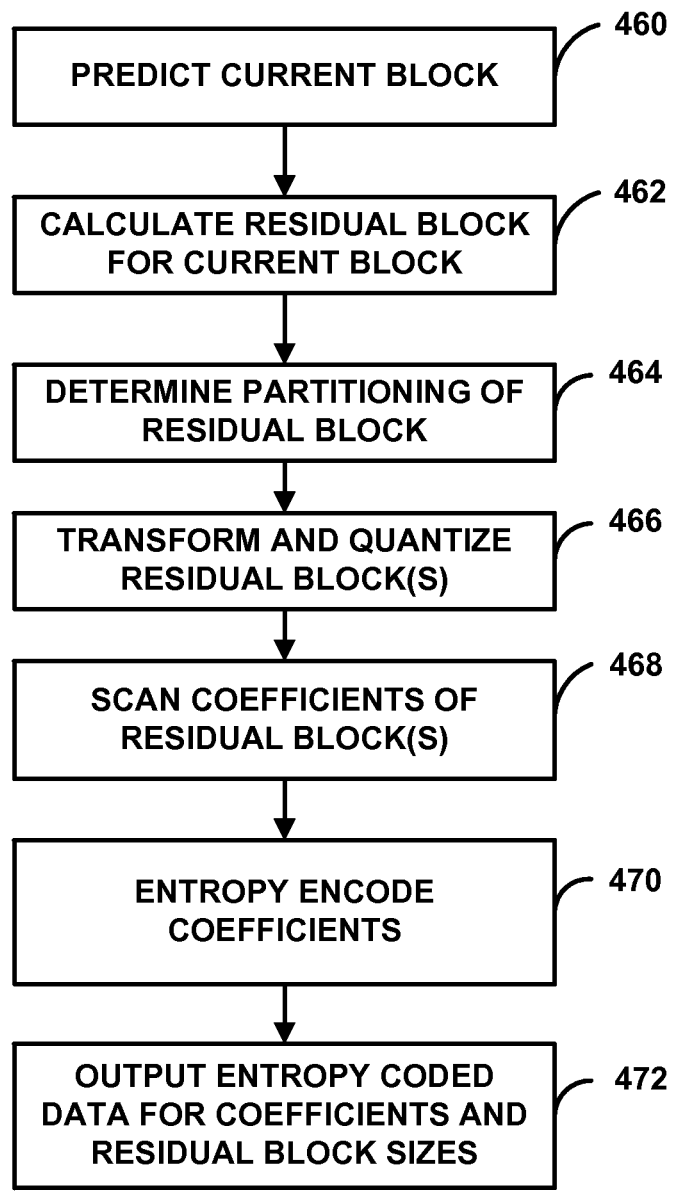
FIG. 15 is a flowchart illustrating an example method for encoding a current block, according to aspects of this disclosure.

FIG. 15 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 15.

In this example, video encoder 20 initially predicts the current block (460). For example, video encoder 20 may calculate one or more prediction units (PUs) for the current block. Video encoder 20 may also determine whether to use non-square PUs for the current block. Video encoder 20 may then calculate a residual block for the current block, e.g., to produce a transform unit (TU) (462). To calculate the residual block, video encoder 20 may calculate a difference between the original, uncoded block and the predicted block for the current block.

In accordance with the techniques of this disclosure, video encoder 20 may also determine partitioning of the residual block into sub-blocks (464). For example, video encoder 20 may determine whether to partition a TU into one or more sub-TUs, which may or may not be square. Video encoder 20 may perform the partitioning determination recursively on each sub-TU. In some examples, video encoder 20 may stop the partitioning determination after partitioning a block into non-square TUs. In other examples, video encoder 20 may determine whether to partition a non-square TU into further sub-TUs only when such sub-TUs would also be non-square, and otherwise, may stop the partitioning determination. Video encoder 20 may further base the partitioning determinations on one or more other factors, such as whether the TUs are luminance or chrominance TUs, size of a corresponding CU, picture type, picture resolution, block type, or other criteria.

Video encoder 20 may then transform and quantize coefficients of the residual block(s) (466). Next, video encoder 20 may scan the quantized transform coefficients of the residual block(s) (468). During the scan, or following the scan, video encoder 20 may entropy encode the coefficients (470). For example, video encoder 20 may encode the coefficients using CAVLC or CABAC. In addition, video encoder 20 may code syntax elements indicating how the residual block (e.g., the parent TU corresponding to the CU) is partitioned. Video encoder 20 may then output the entropy coded data of the block, including information indicating residual block sizes (472). Of course, when certain sizes of TUs are not available, e.g., when certain non-square TUs are not available, video encoder 20 need not provide information of whether TUs have those sizes, because a video decoder may be configured to infer such information.

In this manner, the method of FIG. 15 represents an example of a method including splitting a parent transform unit (TU) of video data into one or more non-square TUs, determining whether the one or more non-square TUs can be further split based at least in part on the one or more non-square TUs being non-square, and coding the one or more non-square TUs based on the determination.

Figure 16:
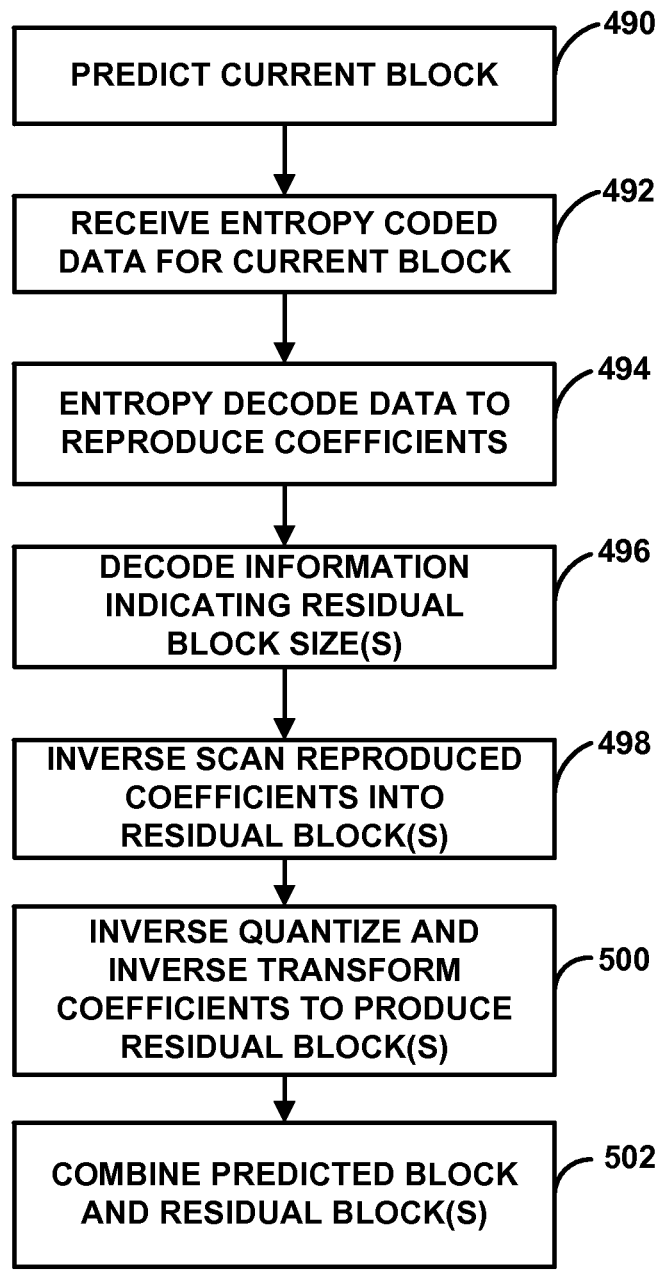
FIG. 16 is a flowchart illustrating an example method for decoding a current block of video data, according to aspects of this disclosure.

FIG. 16 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 16.

Video decoder 30 may predict the current block (490), e.g., using an intra- or inter-prediction mode to calculate a predicted block for the current block. Video decoder 30 may also receive entropy coded data for the current block, such as entropy coded data for coefficients of a residual block corresponding to the current block (492). Video decoder 30 may entropy decode the entropy coded data to reproduce coefficients of the residual block (494).

Video decoder 30 may also decode information indicating sizes for one or more residual blocks, e.g., one or more TUs (496). For example, the information may indicate whether a TU is split into non-square TUs. Video decoder 30 may infer certain block size information, e.g., based upon the availability of non-square TUs based at least in part on whether a parent TU is non-square. When certain block sizes are not available, e.g., because the blocks are non-square or because of a minimum size restriction, video decoder 30 may infer that blocks of the non-available sizes are not available, and hence, need not decode information indicating that blocks are not split into such non-available sizes.

Video decoder 30 may then inverse scan the reproduced coefficients (498), to create one or more blocks of quantized transform coefficients. Video decoder 30 may then inverse quantize and inverse transform the coefficients to produce one or more residual blocks (500). Video decoder 30 may ultimately decode the current block by combining the predicted block and the residual block (502).

In this manner, the method of FIG. 16 represents an example of a method including splitting a parent transform unit (TU) of video data into one or more non-square TUs, determining whether the one or more non-square TUs can be further split based at least in part on the one or more non-square TUs being non-square, and coding the one or more non-square TUs based on the determination.

Figure 17:
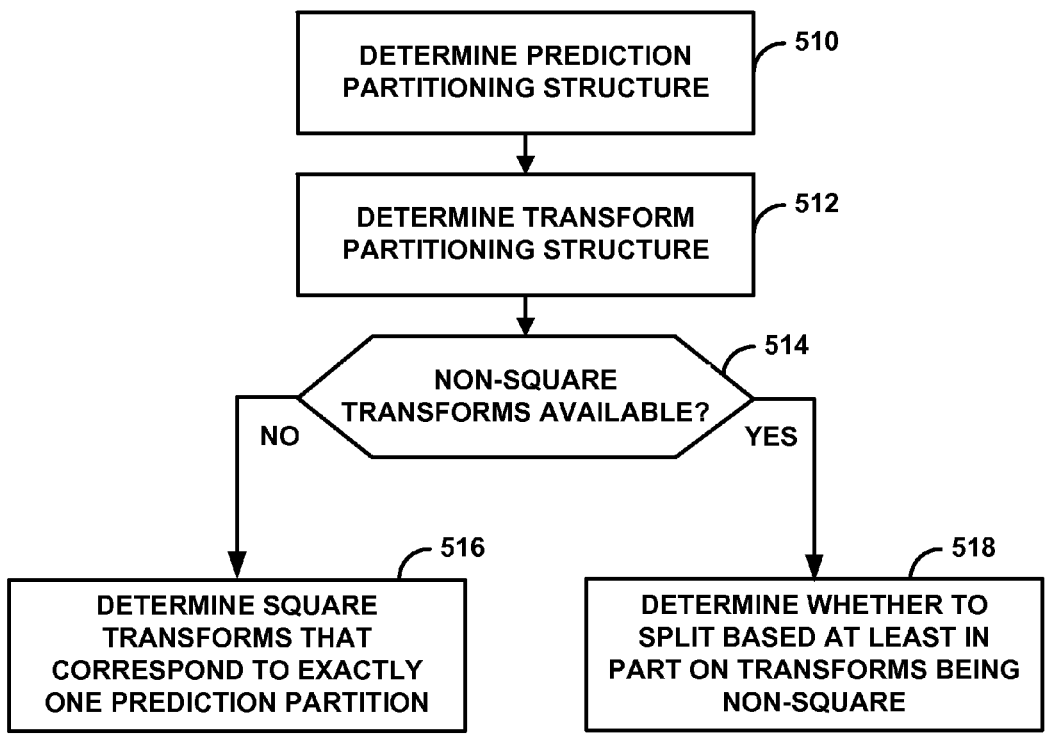
FIG. 17 is a flowchart illustrating an example of coding video data, according to aspects of this disclosure.

FIG. 17 is a flowchart illustrating an example of coding video data, according to aspects of this disclosure. Although described with respect to a video coder, it should be understood that other devices (such as video encoder 20 (FIGS. 1 and 2), video decoder 30 (FIGS. 1 and 3), or other processors) may be configured to perform a method similar to that of FIG. 17.

In the example of FIG. 17, the video coder may determine a prediction partitioning structure for a block of video data (510). For example, the video coder may predict a current block of video data, e.g., using an intra- or inter-prediction mode to calculate a predicted block. The video coder may determine whether to split the block for purposes of prediction. In some examples, the video coder may split the block into more than one sub-block for purposes of prediction, as described above, with one or more sub-blocks being asymmetric in shape.

The video coder may also determine a transform partitioning structure for the block (512). For example, the video coder may determine whether to split the block of transformation. In some examples, the video coder may split the block into more than one sub-block for purposes of transformation, as described above, with one or more sub-blocks being asymmetric in shape. However, asymmetric transforms may not always be available due to a restriction on the video coder.

When non-square transforms are not available, the video coder may determine square transforms for the block that correspond to exactly one prediction partition (516). For example, as described above, the video coder may split a transform block until each transform is applied to only one prediction partition. The video coder may perform the splitting in accordance with a forced transform splitting scheme. When non-square transforms are available and the video coder applies at least one non-square transform, the video coder may determine whether to split the block further based on the transforms being non-square (518).

It should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
    determining that residual quadtree splitting is enabled with respect to a block of the encoded video data;
    determining a maximum residual quad tree depth with respect to the residual quadtree splitting of the block of the encoded video data;
    determining that a prediction partitioning structure for reconstructing pixel values associated with the block of video data includes one or more asymmetric motion partition (AMP) boundaries;
    determining a transform partitioning structure for applying one or more inverse transforms to the reconstructed pixel values, wherein determining the transform partitioning structure includes:
        performing, in response to the residual quadtree splitting being enabled with respect to the block of the encoded video data and based on the residual quadtree splitting resulting in one or more transforms crossing at least one AMP boundary of the AMP boundaries, forced splitting of a parent transform unit associated with the block of the encoded video data, wherein the parent transform unit has an equal area with respect to the block of video data, wherein the forced splitting of the parent transform unit produces a plurality of square transforms, and wherein each square transform of the plurality of square transforms is at the maximum residual quad tree depth associated with the residual quadtree splitting; and
        upon performing the forced splitting of the parent transform unit to form the plurality of square transforms, determining each respective square transform of the plurality of square transforms based on the one or more AMP boundaries such that each respective square transform of the plurality of square transforms corresponds to a maximum transform size that does not cross any AMP boundary of the one or more AMP boundaries.

2. The method of claim 1, wherein performing the forced splitting of the parent transform unit to form the plurality of square transforms comprises splitting at least one transform that is applied across a respective AMP boundary of the one or more AMP boundaries and without splitting any transforms that are not applied across the respective AMP boundary.

3. The method of claim 1, further comprising adaptively enabling the determination of the plurality of square transforms based on a coding characteristic associated with the block of the encoded video data, the coding characteristic comprising one of a block size, a picture type, a picture size, a prediction mode, a motion vector amplitude, or a reference index associated with the block of the encoded video data.

4. The method of claim 1, further comprising applying differently sized transforms to the residual values.

5. The method of claim 4, wherein the differently sized transforms include at least one transform having a size smaller than a smallest transform size indicated by a residual quad-tree structure associated with the forced splitting.

6. The method of claim 1, wherein the prediction partitioning structure comprises prediction units sized one of nL×2N, nR×2N, 2N×nU, or 2N×nD.

7. The method of claim 1, further comprising determining that each respective square transform of the plurality of square transforms can only be further split into further non-square transforms.

8. The method of claim 7, wherein the parent transform unit comprises a parent luminance transform unit and wherein the further non-square transforms comprise one or more non-square luminance transforms, the method further comprising:
    splitting a parent chrominance transform unit into a plurality of non-square chrominance transforms, wherein the parent chrominance transform unit corresponds to the parent luminance transform unit; and
    splitting the one or more non-square chrominance transforms.

9. The method of claim 1, further comprising applying one or more transform splitting restrictions based at least in part on one or more of a size of a coding unit corresponding to the parent transform unit, a picture type of a picture including the parent transform unit, a pixel resolution of the picture including the parent transform unit, and a block type for the coding unit corresponding to the parent transform unit.

10. The method of claim 1, the method being executable on a wireless communication device, wherein the wireless communication device comprises:
    data storage medium configured to store the block of video data;
    a processor configured to execute instructions to process the block of video data stored in the data storage medium; and
    a receiver to receive the block of video data.

11. The method of claim 10, wherein the wireless communication device is a cellular telephone and the block of video data is received by the receiver and modulated according to a communication standard.

12. A method of encoding video data, the method comprising:
    determining that a prediction partitioning structure for residual pixel values associated with a block of video data includes one or more asymmetric motion partition (AMP) boundaries;
    determining a transform partitioning structure for applying one or more transforms to the residual pixel values, wherein determining the transform partitioning structure includes:

determining that a residual quadtree splitting of the block results in one or more transforms crossing at least one AMP boundary of the AMP boundaries;

performing, based on the transform splitting of the block resulting in the one or more transforms crossing the at least one AMP boundary of the AMP boundaries, forced splitting of a parent transform unit associated with the block of video data, wherein the parent transform unit has an equal area with respect to the block of video data, wherein the forced splitting of the parent transform unit produces a plurality of square transforms, and wherein each square transform of the plurality of square transforms is at a maximum residual quad tree depth associated with the residual quadtree splitting;

upon performing the forced splitting of the parent transform unit to form the plurality of square transforms, determining each respective square transform of the plurality of square transforms based on the one or more AMP boundaries such that each respective square transform of the plurality of square transforms corresponds to a maximum transform size that does not cross any AMP boundary of the one or more AMP boundaries;

encoding an indication that the transform splitting is enabled with respect to the block of video data;

encoding an indication of the maximum residual quad tree depth with respect to the transform splitting of the block of video data; and encoding the residual pixel values based on the determined transform partitioning structure.

13. The method of claim 12, wherein performing the forced splitting to form the plurality of square transforms comprises splitting at least one transform that is applied across a respective AMP boundary of the one or more AMP boundaries and without splitting any transforms that are not applied across the respective AMP boundary of the one or more AMP boundaries.

14. The method of claim 12, further comprising adaptively enabling the determination of the plurality of square transforms based on a coding characteristic associated with the block of video data, the coding characteristic comprising one of a block size, a picture type, a picture size, a prediction mode, a motion vector amplitude, or a reference index associated with the block of video data.

15. The method of claim 12, further comprising applying differently sized transforms to the residual values.

16. The method of claim 15, wherein the differently sized transforms include at least one transform having a size smaller than a smallest transform size indicated by a residual quad-tree structure associated with the forced splitting.

17. The method of claim 12, wherein the prediction partitioning structure comprises prediction units sized one of nL×2N, nR×2N, 2N×nU, or 2N×nD.

18. The method of claim 12, wherein further comprising determining that each respective square transform of the plurality of square transforms can only be further split into further non-square transforms.

19. The method of claim 18, wherein the parent transform unit comprises a parent luminance transform unit and wherein the further non-square transforms comprise one or more non-square luminance transforms, the method further comprising:

splitting a parent chrominance transform unit into a plurality of non-square chrominance transforms, wherein the parent chrominance transform unit corresponds to the parent luminance transform unit; and splitting the one or more non-square chrominance transforms.

20. The method of claim 11, further comprising applying one or more transform splitting restrictions based at least in part on one or more of a size of a coding unit corresponding to the parent transform unit, a picture type of a picture including the parent transform unit, a pixel resolution of the picture including the parent transform unit, and a block type for the coding unit corresponding to the parent transform unit.

21. An apparatus for decoding encoded video data comprising:

a memory configured to store a the encoded video data; and one or more processors coupled to the memory, the one or more processors being configured to:

determine that residual quadtree splitting is enabled with respect to a block of the encoded video data stored to the memory;

determine a maximum residual quad tree depth with respect to the residual quadtree splitting of the block of the encoded video data stored to the memory;

determine that a prediction partitioning structure for reconstructing pixel values associated with the block of the encoded video data stored to the memory includes one or more asymmetric motion partition (AMP) boundaries;

determine a transform partitioning structure for applying one or more inverse transforms to the reconstructed pixel values, wherein to determine the transform partition structure, the one or more processors are configured to:

perform, in response to the residual quadtree splitting being enabled with respect to the block of video data and based on the transform splitting resulting in one or more transforms crossing at least one AMP boundary of the AMP boundaries, forced splitting of a parent transform unit associated with the block of the encoded video data, wherein the parent transform unit has an equal area with respect to the block of video data, wherein the forced splitting of the parent transform unit produces a plurality of square transforms, and wherein each square transform of the plurality of square transforms is at the maximum residual quad tree depth associated with the residual quadtree splitting;

upon performing the forced splitting of the parent transform unit to form the plurality of square transforms, determine each respective square transform of the plurality of square transforms based on one or more AMP boundaries of the one or more AMP boundaries such that each square transform of the one or more square transforms corresponds to a maximum transform size that does not cross any AMP boundary of the one or more AMP boundaries based on the splitting of the parent transform unit into the square transforms; and upon determining to split the parent transform unit into a plurality of non-square transforms, determine that the a plurality of non-square transforms are not to be further split based at least in part on each of the a plurality of non-square transforms being non-square.

22. The apparatus of claim 21, wherein to perform the forced splitting of the parent transform unit to form the plurality of square transforms, the one or more processors are configured to split at least one transform that is applied across a respective AMP boundary of the one or more AMP boundaries and without splitting any transforms that are not applied across the respective AMP boundary.

23. The apparatus of claim 21, wherein the one or more processors are further configured to adaptively enable the determination of the plurality of square transforms based on a coding characteristic associated with the block of the encoded video data, the coding characteristic comprising one of a block size, a picture type, a picture size, a prediction mode, a motion vector amplitude, or a reference index associated with the block of the encoded video data.

24. The apparatus of claim 21, wherein the one or more processors are further configured to apply differently sized transforms to the residual values.

25. The apparatus of claim 24, wherein the differently sized transforms include at least one transform having a size smaller than a smallest transform size indicated by a residual quad-tree structure associated with the forced splitting.

26. The apparatus of claim 21, wherein the prediction partitioning structure comprises prediction units sized one of nL×2N, nR×2N, 2N×nU, or 2N×nD.

27. The apparatus of claim 21, wherein the one or more processors are further configured to determine that each respective square transform of the plurality of transforms can only be further split into further non-square transforms.

28. The apparatus of claim 27, wherein the parent transform unit comprises a parent luminance transform unit, wherein the further non-square transforms comprise one or more non-square luminance transforms, and wherein the one or more processors are further configured to:
split a parent chrominance transform unit into a plurality of chrominance non-square transforms, wherein the parent chrominance transform unit corresponds to the parent luminance transform unit; and
split the one or more non-square chrominance transforms.

29. The apparatus of claim 21, wherein the one or more processors are further configured to apply one or more transform splitting instructions based at least in part on one or more of a size of a coding unit corresponding to the parent transform unit, a picture type of a picture including the parent transform unit, a pixel resolution of the picture including the parent transform unit, and a block type for the coding unit corresponding to the parent transform unit.

30. The apparatus of claim 21, wherein to decode the predicted pixel values, the one or more processors are configured to obtain an indication of the predicted pixel values from an encoded bitstream.

31. The apparatus of claim 21, wherein the apparatus is a wireless communication device, further comprises a receiver configured to receive the block of video data.

32. The apparatus of claim 31, wherein the wireless communication device is a cellular telephone and the block of video data is received by the receiver and modulated according to a communication standard.

33. An apparatus for decode encoded video data, the apparatus comprising:
means for determining that residual quadtree splitting is enabled with respect to a block of the encoded video data;
means for determining a maximum residual quad tree depth with respect to the residual quadtree splitting of the block of the encoded video data;
means for determining that a prediction partitioning structure for reconstructing pixel values associated with the block of video data includes one or more asymmetric motion partition (AMP) boundaries;
means for determining a transform partitioning structure for applying one or more inverse transforms to the reconstructed pixel values, wherein the means for determining the transform partitioning structure comprises:
means for performing, in response to the residual quadtree splitting being enabled with respect to the block of the encoded video data and based on the residual quadtree splitting resulting in one or more transforms crossing at least one AMP boundary of the AMP boundaries, forced splitting of a parent transform unit associated with the block of the encoded video data, wherein the parent transform unit has an equal area with respect to the block of video data, wherein the forced splitting of the parent transform unit produces a plurality of square transforms, and wherein each square transform of the plurality of square transforms is at the maximum residual quad tree depth associated with the residual quadtree splitting; and
means for determining, upon performing the forced splitting of the parent transform unit to form the plurality of square transforms, each respective square transform of the plurality of square transforms based on the one or more AMP boundaries such that each respective square transform of the plurality of square transforms corresponds to a maximum transform size that does not cross any AMP boundary of the one or more AMP boundaries.

34. The apparatus of claim 33, wherein the means for performing the forced splitting of the parent transform unit to form the plurality of square transforms comprises means for splitting at least one transform that is applied across a respective AMP boundary of the one or more AMP boundaries and without splitting any transforms that are not applied across the respective AMP boundary.

35. The apparatus of claim 33, further comprising means for adaptively enabling the determination of the plurality of square transforms based on a coding characteristic associated with the block of the encoded video data, the coding characteristic comprising one of a block size, a picture type, a picture size, a prediction mode, a motion vector amplitude, or a reference index associated with the block of the encoded video data.

36. The apparatus of claim 33, further comprising means for applying differently sized transforms to the residual values.

37. The apparatus of claim 36, wherein the differently sized transforms include at least one transform having a size smaller than a smallest transform size indicated by a residual quad-tree structure associated with the forced splitting.

38. The apparatus of claim 33, wherein the prediction partitioning structure comprises prediction units sized one of nL×2N, nR×2N, 2N×nU, or 2N×nD.

39. The apparatus of claim 33, further comprising means for determining that each respective square transform of the plurality of square transforms can only be further split into further non-square transforms.

40. The apparatus of claim 39, wherein the parent transform unit comprises a parent luminance transform unit and wherein the further non-square transforms comprise one or more non-square luminance transforms, the apparatus further comprising:
means for splitting a parent chrominance transform unit into a plurality of non-square chrominance transforms, wherein the parent chrominance transform unit corresponds to the parent luminance transform unit; and
means for splitting the one or more non-square chrominance transforms.

41. The apparatus of claim 33, further comprising means for applying one or more transform splitting restrictions based at least in part on one or more of a size of a coding unit corresponding to the parent transform unit, a picture type of a picture including the parent transform unit, a pixel resolution of the picture including the parent transform unit, and a block type for the coding unit corresponding to the parent transform unit.

42. A non-transitory computer-readable medium storing instructions thereon that, when executed, cause one or more processors to:
   determine that residual quadtree splitting is enabled with respect to a block of encoded video data;
   determine a maximum residual quad tree depth with respect to the residual quadtree splitting of the block of the encoded video data;
   determine that a prediction partitioning structure for reconstructing pixel values associated with the block of video data includes one or more asymmetric motion partition (AMP) boundaries;
   determine a transform partitioning structure for applying one or more inverse transforms to the reconstructed pixel values, wherein to determine the transform partitioning structure, the instructions cause the one or more processors to:
      perform, in response to the residual quadtree splitting being enabled with respect to the block of the encoded video data and based on the residual quadtree splitting resulting in one or more transforms crossing at least one AMP boundary of the AMP boundaries of the AMP boundaries, forced splitting of a parent transform unit associated with the block of the encoded video data, wherein the parent transform unit has an equal area with respect to the block of video data, wherein the forced splitting of the parent transform unit produces a plurality of square transforms, and wherein each square transform of the plurality of square transforms is at the maximum residual quad tree depth associated with the residual quadtree splitting; and
      upon performing the forced splitting of the parent transform unit to form the plurality of square transforms, determine each respective square transform of the plurality of square transforms based on the one or more AMP boundaries such that each respective square transform of the plurality of square transforms corresponds to a maximum transform size that does not cross any AMP boundary of the one or more AMP boundaries.

43. The non-transitory computer-readable medium of claim 42, further comprising instructions that cause the one or more processors to split at least one transform that is applied across a respective AMP boundary of the one or more AMP boundaries and without splitting any transforms that are not applied across the respective AMP boundary.

44. The non-transitory computer-readable medium of claim 42, further comprising instructions that cause the one or more processors to adaptively enable the determination of the plurality of square transforms based on a coding characteristic associated with the block of the encoded video data, the coding characteristic comprising one of a block size, a picture type, a picture size, a prediction mode, a motion vector amplitude, or a reference index associated with the block of the encoded video data.

45. The non-transitory computer-readable medium of claim 42, further comprising instructions that cause the one or more processors to apply differently sized transforms to the residual values.

46. The non-transitory computer-readable medium of claim 45, wherein the differently sized transforms include at least one transform having a size smaller than a smallest transform size indicated by a residual quad-tree structure associated with the forced splitting.

47. The non-transitory computer-readable medium of claim 42, wherein the prediction partitioning structure comprises prediction units sized one of nL×2N, nR×2N, 2N×nU, or 2N×nD.

48. The non-transitory computer-readable medium of claim 42, further comprising instructions that cause the one or more processors to determine that each respective square transform of the plurality of square transforms can only be further split into further non-square transforms.

49. The non-transitory computer-readable medium of claim 48, wherein the parent transform unit comprises a parent luminance transform unit and wherein the further non-square transforms comprise one or more non-square luminance transforms, the one or more processors further configured to:
   split a parent chrominance transform unit into a plurality of non-square chrominance transforms, wherein the parent chrominance transform unit corresponds to the parent luminance transform unit; and
   split the one or more non-square chrominance transforms.

50. The non-transitory computer-readable medium of claim 42, further comprising instructions that cause the one or more processors to apply one or more transform splitting instructions based at least in part on one or more of a size of a coding unit corresponding to the parent transform unit, a picture type of a picture including the parent transform unit, a pixel resolution of the picture including the parent transform unit, and a block type for the coding unit corresponding to the parent transform unit.

* * * * *